United States Patent
Hachimura

(10) Patent No.: US 7,818,438 B2
(45) Date of Patent: Oct. 19, 2010

(54) CONTROL APPARATUS AND CONTROL METHOD

(75) Inventor: Futoshi Hachimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 12/132,397

(22) Filed: Jun. 3, 2008

(65) Prior Publication Data

US 2008/0307073 A1   Dec. 11, 2008

(30) Foreign Application Priority Data

Jun. 6, 2007   (JP)   ............................. 2007-150777

(51) Int. Cl.
*G06F 15/16* (2006.01)
(52) U.S. Cl. ...................... 709/229; 709/225; 709/226; 709/232; 709/238
(58) Field of Classification Search ................. 709/225, 709/226, 229, 232–234, 238
See application file for complete search history.

(56) References Cited

U.S. PATENT DOCUMENTS

| | | | | |
|---|---|---|---|---|
| 4,748,685 | A * | 5/1988 | Rozanski, Jr. ............... | 455/218 |
| 6,055,416 | A * | 4/2000 | Hachimura ................. | 455/70 |
| 6,393,470 | B1 * | 5/2002 | Kanevsky et al. ........... | 709/219 |
| 7,468,685 | B1 * | 12/2008 | Macaluso .................... | 341/101 |
| 2003/0084184 | A1 * | 5/2003 | Eggleston et al. ........... | 709/234 |
| 2009/0164653 | A1 * | 6/2009 | Mandyam et al. ........... | 709/231 |
| 2009/0164657 | A1 * | 6/2009 | Li et al. ...................... | 709/233 |

FOREIGN PATENT DOCUMENTS

| | | |
|---|---|---|
| JP | 2000-232599 | 8/2000 |
| JP | 2003-233548 | 8/2003 |
| JP | 2005-100220 | 4/2005 |

OTHER PUBLICATIONS

U.S. Appl. No. 09/213,314, filed Dec. 16, 1998, Viktors Berstis.

* cited by examiner

*Primary Examiner*—Phuoc Nguyen
(74) *Attorney, Agent, or Firm*—Cowan, Liebowitz & Latman, P.C.

(57) ABSTRACT

In externally uploading data to a storage device in a network, the process for the storage device is controlled in accordance with the state in the network. This invention provides a control apparatus which controls a process for a storage device in externally uploading data to the storage device by communicating with the network to which the storage device and a remote access server are connected. The control apparatus receives an event transmitted from the storage device when it is accessed, calculates the process load of the storage device, and instructs the remote access server to limit the transfer amount of data to the storage device when the calculated process load is larger than a predetermined threshold value.

12 Claims, 24 Drawing Sheets

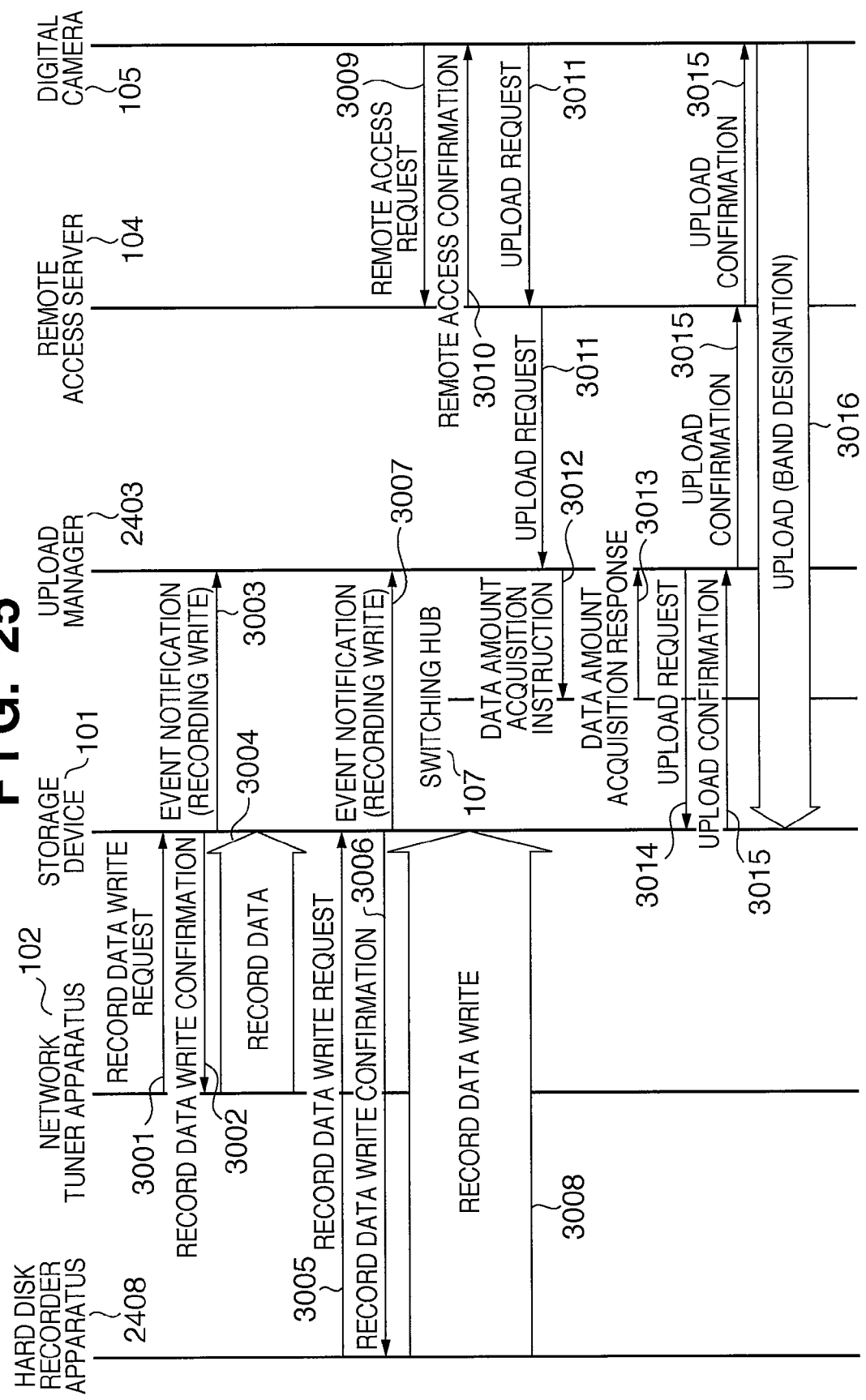

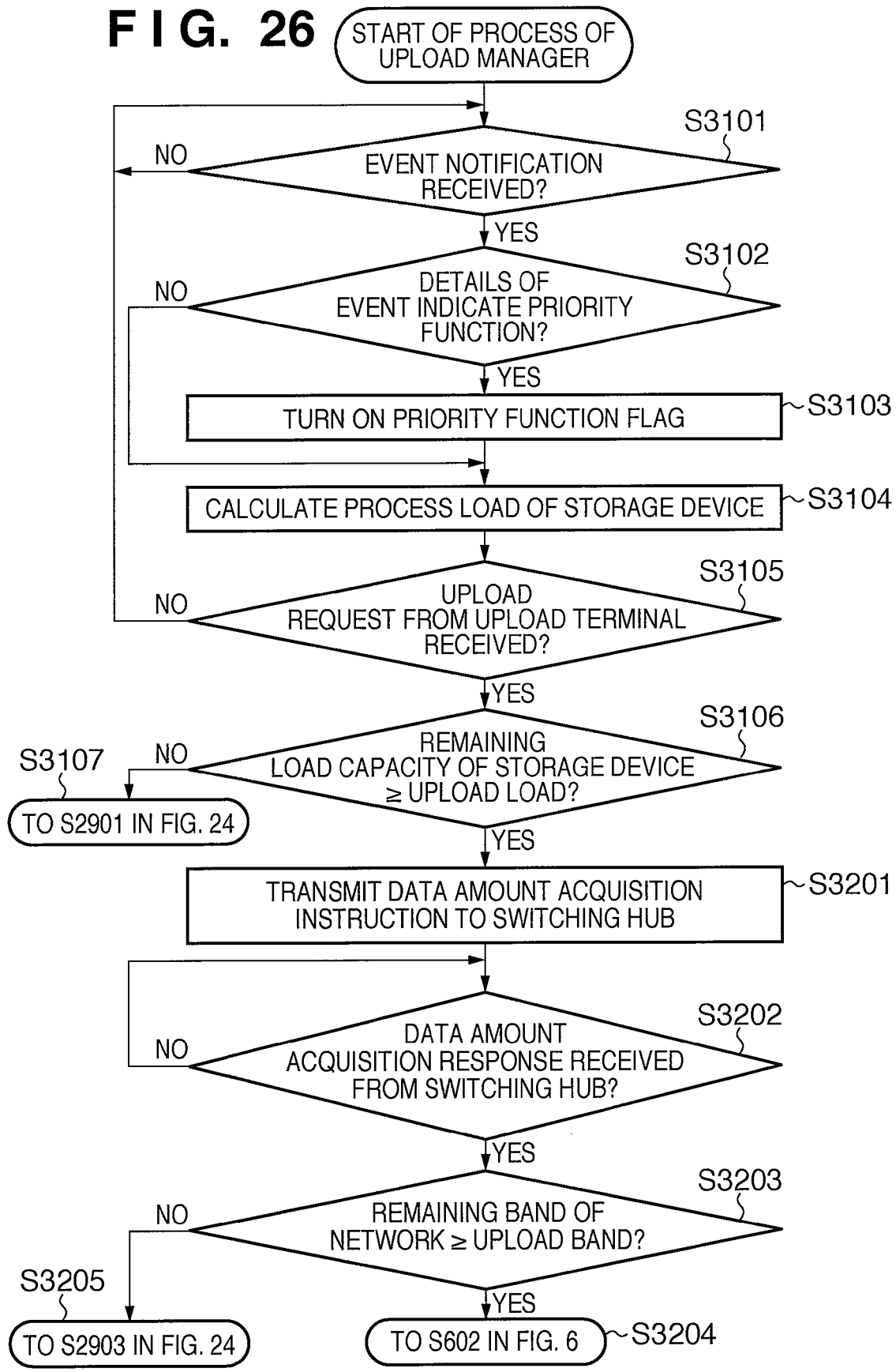

CONTROL APPARATUS AND CONTROL METHOD

BACKGROUND OF THE INVENTION

1. Field of the Invention

The present invention relates to a control technique of controlling a process for a storage device in a network in transferring data to the storage device via a remote access server.

2. Description of the Related Art

Conventionally, an image capturing apparatus such as a digital camera or a digital video camcorder is connected to a network directly or via an adapter to upload image or video data stored in the image capturing apparatus to a server apparatus in the network. This process ensures a free space in the storage device of the image capturing apparatus.

A proposal about such a data upload process is described in, for example, Japanese Patent Laid-Open No. 2000-232599. According to Japanese Patent Laid-Open No. 2000-232599 (U.S. patent application Ser. No. 09/213,314), when a digital camera or an adapter detects connection to a network, communication connection to a transfer destination system is established via the network, thereby implementing automatic image data transfer to the transfer destination. This technique automatically ensures a free space in the storage device of the digital camera.

On the other hand, a recent home network often includes a router and makes a firewall function work on it to prevent viruses and unauthorized access from the Internet. The firewall function improves the security of the network but also makes it difficult for the network user to externally access a device in the network via the Internet. To enable external data transmission/reception, normally, a remote access server is arranged in the network.

Various proposals have been made so far for the process of externally uploading data to the server apparatus in the network using the remote access server.

For example, Japanese Patent Laid-Open No. 2003-233548 discloses a network system which implements, in the data upload process, upload by proxy transfer using a network switch and a proxy server arranged between a transfer source computer and a transfer destination computer.

According to Japanese Patent Laid-Open No. 2003-233548, the network switch has a monitoring means for monitoring traffic and detecting upload traffic as an upload target. The proxy server has an analyzing means for extracting the information of the transfer destination computer from the upload traffic, and a proxy reception means for receiving a file on behalf of the transfer destination computer. The proxy server also has a proxy transmission means for transmitting the received file to the transfer destination computer on behalf of the transfer source computer. With this arrangement, the network system can cause the proxy server to execute the upload process even when upload traffic has occurred.

Various proposals have also been made concerning the functions on the server apparatus side in the upload process.

For example, Japanese Patent Laid-Open No. 2005-100220 discloses an arrangement in which when providing a service in response to a request from a client, a server apparatus calculates the resource occupation value of each service based on the resource load value of the resource included in the server apparatus and the priority order of each client. According to this reference, it is possible to cause the server apparatus to execute a preset process for each service based on the result of comparison between the calculated resource occupation value and a predetermined threshold value.

However, the arrangement disclosed in Japanese Patent Laid-Open No. 2000-232599 does not consider the process load on the server apparatus side in executing the upload process.

Hence, in Japanese Patent Laid-Open No. 2000-232599, for example, if the load on the server apparatus side has already reached the performance limit before transferring upload data to it, data transfer may fail. Even when data transfer has succeeded, the processes of other devices connected to the server apparatus are held over. As a result, if a television (TV) tuner connected to the server apparatus is writing TV record data in it, the write of TV record data fails.

Similarly, Japanese Patent Laid-Open No. 2003-233548 discloses the process considering upload traffic but no process considering the process load on the server apparatus side.

Generally, to upload data via a remote access server, the user carries out information registered in the remote access server in advance together with an upload terminal (e.g., digital camera) and accesses the remote access server based on the information. For this reason, upload often fails due to network traffic in the home network rather than upload traffic from the upload terminal to the remote access server.

There is a demand for implementing, in a network, an arrangement for controlling the upload process in accordance with the state in the network.

Japanese Patent Laid-Open No. 2005-100220 discloses an arrangement which performs a process in consideration of the state in the network, that is, the process load on the server apparatus side. However, the storage device serving as the server apparatus of the data transfer destination is often not an advanced high-performance storage device assumed by Japanese Patent Laid-Open No. 2005-100220 but an inexpensive single-function storage device having only medium performance. For this reason, the storage device only increases its process load by executing the control process according to the process load.

Controlling the upload process in consideration of the process load of the storage device is preferably implemented by any device in the network other than the storage device.

It is also preferable to not only control the upload process based on the process load on the storage device side but also control the whole process for the storage device while monitoring the state in the network.

SUMMARY OF THE INVENTION

The present invention has been made in consideration of the above-described problems.

According to the present invention, there is provided a control apparatus for controlling a process for a storage device, comprising:

an acquisition unit configured to acquire a process load of the storage device; and a limiting unit configured to limit a transfer amount of data to be transferred to the storage device via a remote access server in accordance with the process load acquired by the acquisition unit.

According to the present invention, when transferring data to a storage device in a network via a remote access server, it is possible to control a process for the storage device in accordance with the state in the network.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 25 is a sequence chart showing the sequence of the communication process of the devices included in a network system 2400 upon receiving an upload process request from a digital camera 105;

FIG. 26 is a flowchart illustrating the detailed sequence of the process of an upload manager 2403; and

DESCRIPTION OF THE EMBODIMENTS

Preferred embodiments of the present invention will now be described in detail in accordance with the accompanying drawings. The following embodiments will be described by exemplifying a case in which a control program (upload manager) for implementing a control method of the present invention is executed on a control apparatus (remote access server).

In a description of various kinds of processes implemented by the upload manager in the remote access server, the first to fourth embodiments assume different states in the network.

In the first embodiment, when a user is uploading data to a NAS (Network Attached Storage; to be simply referred to as a storage device hereinafter) in a network, another device accesses the storage device. More specifically, a network tuner apparatus in the network sends a record data write request to the storage device, and this increases the process load of the storage device.

In the second embodiment, a user uploads data when a plurality of devices in a network are accessing a storage device. More specifically, a network tuner apparatus writes record data in the storage device, and a network player apparatus reads out record data from the storage device. This greatly increases the process load of the storage device, and the user uploads data in this state.

In the third and fourth embodiments, a user uploads data when a plurality of devices in a network are accessing a storage device. More specifically, a PC (Personal Computer) and a hard disk recorder apparatus in the network transfer data to the storage device. This increases the process load of the storage device, and the user uploads data in this state. The priority of the data upload process is different from the second embodiment.

The embodiments will be described below in detail.

First Embodiment

1. Arrangement of Network System

Figure 1:
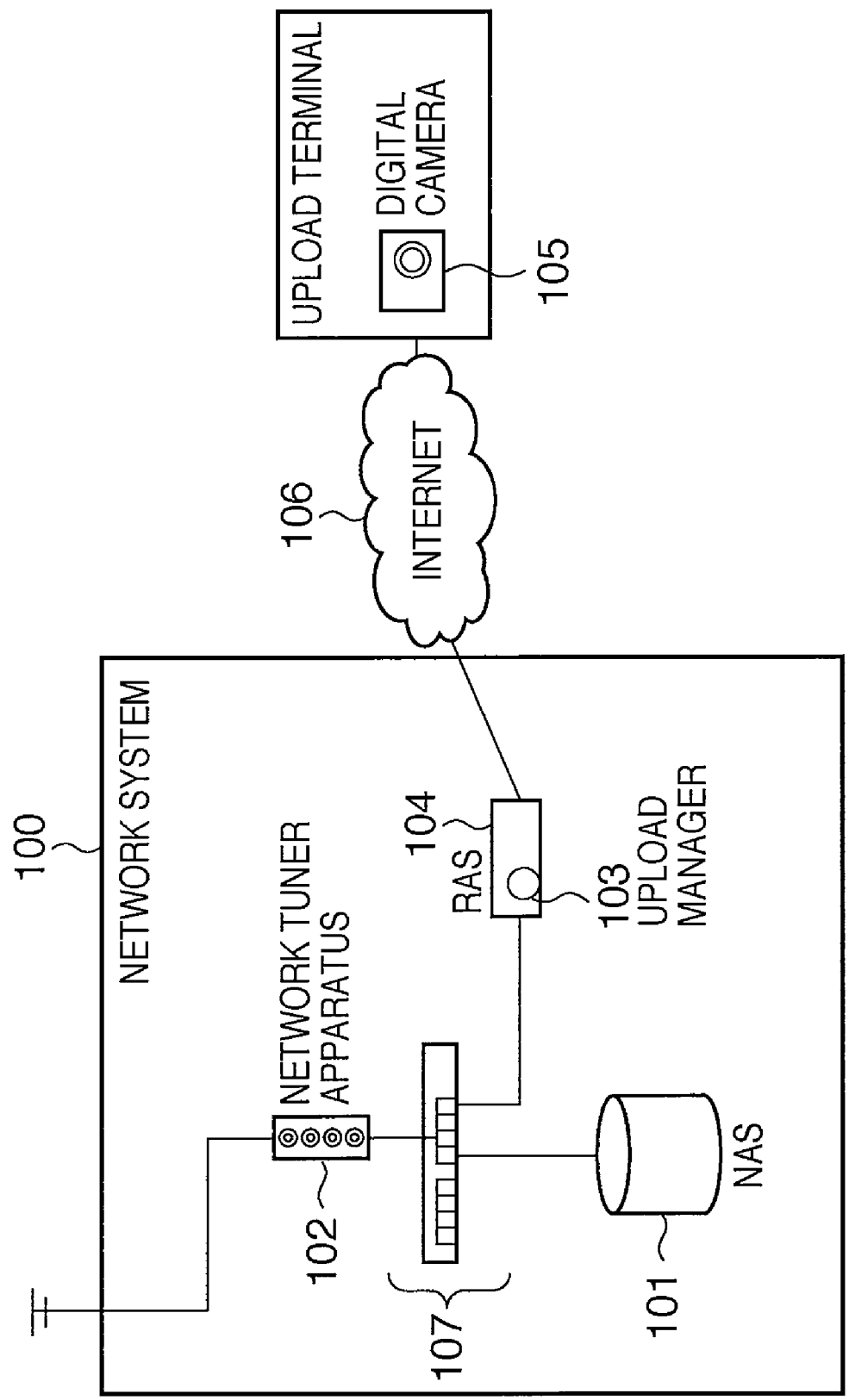
FIG. 1 is a view showing the arrangement of a network system 100 to which a remote access server having a control program (upload manager) for implementing a control method of the present invention is connected.

FIG. 1 is a view showing the arrangement of a network system 100 to which a RAS (Remote Access Server) having a control program (upload manager) for implementing a control method according to this embodiment is connected. As shown in FIG. 1, the network system 100 is designed to make an upload terminal (digital camera 105) carried outside the network connectable to a RAS (Remote Access Server) 104 via Internet 106.

A storage device (NAS: Network Attached Storage) 101 is connectable to a network 107 alone.

A network tuner apparatus 102 has a function of transferring a TV radio image to the storage device 101 via the network 107 as record data.

An upload manager 103 monitors the process load of the storage device 101 and, when the digital camera 105 uploads data via the remote access server 104, controls the upload process.

The remote access server 104 manages remote access from the digital camera 105 or the like. The remote access management function is implemented on a router which has a firewall function of separately managing the Internet 106 (external network) and the network 107 (internal network).

The digital camera 105 (including a normal digital camera having a network connection adapter) can remote-access the network system 100.

In this embodiment, the upload manager 103 runs on the remote access server 104. However, the present invention is not limited to this. For example, the upload manager may run on any device in the network system 100 other than the storage device 101. The following description will be made assuming that the upload manager runs on the remote access server 104.

2. Functional Arrangement of Storage Device

Figure 2:
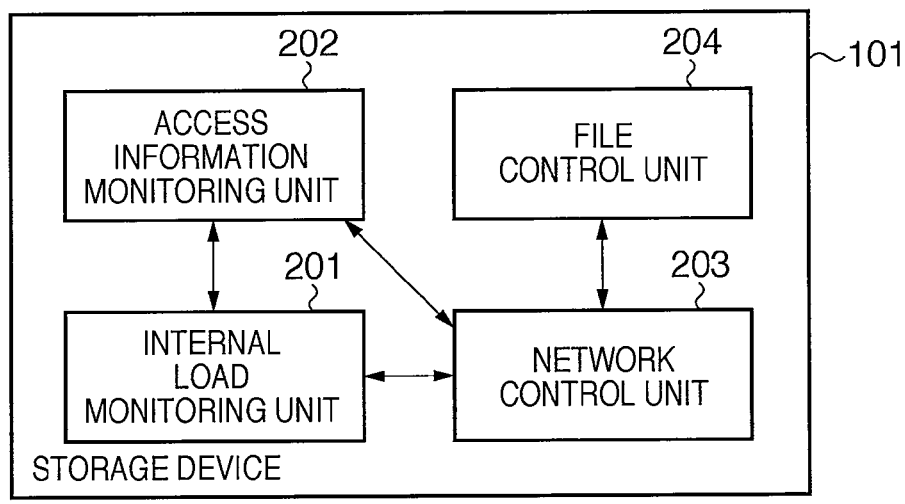
FIG. 2 is a block diagram showing the functional arrangement of a storage device 101 included in the network system 100.

FIG. 2 is a block diagram showing the functional arrangement of the storage device 101 included in the network system 100. The storage device 101 has functions 201 to 204.

The internal load monitoring unit 201 monitors the process load of the storage device 101 itself, including the network load and CPU/MPU load. When the process load is larger than a predetermined threshold value, the internal load monitoring unit 201 generates an event.

The access information monitoring unit 202 analyzes a packet received via the network 107 and determines which device is accessing using what kind of protocol. This enables to manage access information representing the device of the access source and its function.

When inquired about access information, the access information monitoring unit 202 executes a process of, for example, returning the access information to the inquiry source.

The network control unit 203 controls a security function and a server function of managing a device that makes access via the network 107.

The file control unit 204 writes data having the form of a file in a secondary storage such a hard disk in the storage device 101, or reads out the file from the secondary storage.

3. Functional Arrangement of Upload Manager

Figure 3:
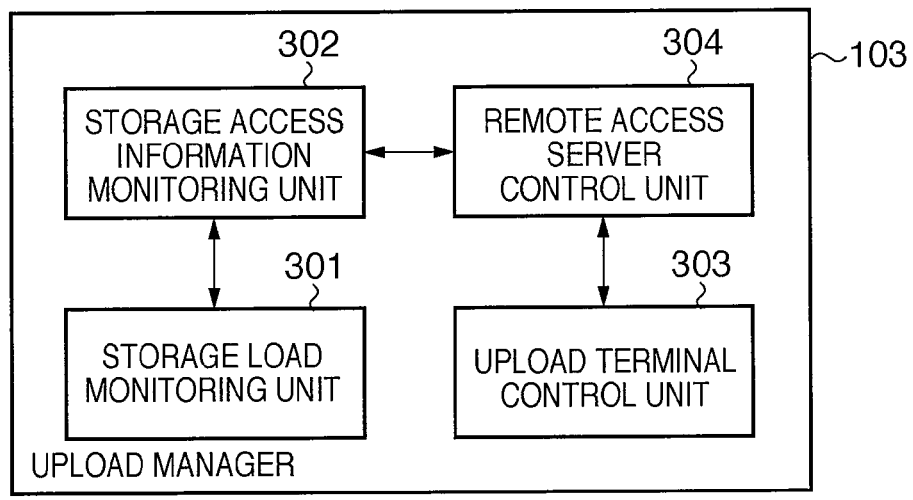
FIG. 3 is a block diagram showing the functional arrangement of an upload manager 103 which is a control program for implementing a control method according to the first embodiment of the present invention.

FIG. 3 is a block diagram showing the functional arrangement of the upload manager 103 which is a control program for implementing the control method according to the first embodiment of the present invention. The upload manager 103 has functions 301 to 304.

The storage load monitoring unit 301 acquires and monitors the process load of the storage device 101.

The storage access information monitoring unit 302 acquires and monitors access information representing the type of a device that has accessed the storage device 101 and the function type of the device.

The upload terminal control unit 303 manages an upload terminal (digital camera 105 in this specification) that accesses via the remote access server 104.

The remote access server control unit 304 issues a control instruction to the remote access server 104 concerning an upload process from an upload terminal such as the digital camera 105.

4. Functional Arrangement of Remote Access Server

Figure 4:
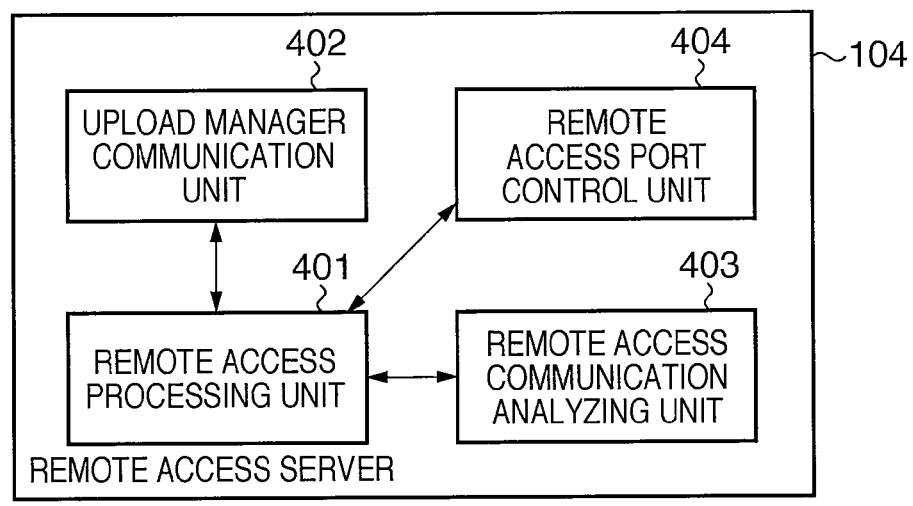
FIG. 4 is a block diagram showing the functional arrangement of a remote access server 104 included in the network system 100.

FIG. 4 is a block diagram showing the functional arrangement of the remote access server 104 included in the network system 100. The remote access server 104 has functions 401 to 404.

The remote access processing unit 401 manages remote access from the Internet 106 (external network).

The upload manager communication unit 402 communicates with the upload manager 103.

The remote access communication analyzing unit 403 acquires and analyzes data transmitted/received between the remote access server 104 and an upload terminal (digital camera 105) which remote-accesses it.

The remote access port control unit 404 controls a network port (e.g., TCP port) accessed by an upload terminal (digital camera 105) for which the remote access processing unit 401 has permitted remote access.

5. Sequence of Communication Process in Network System 100

Figure 5:
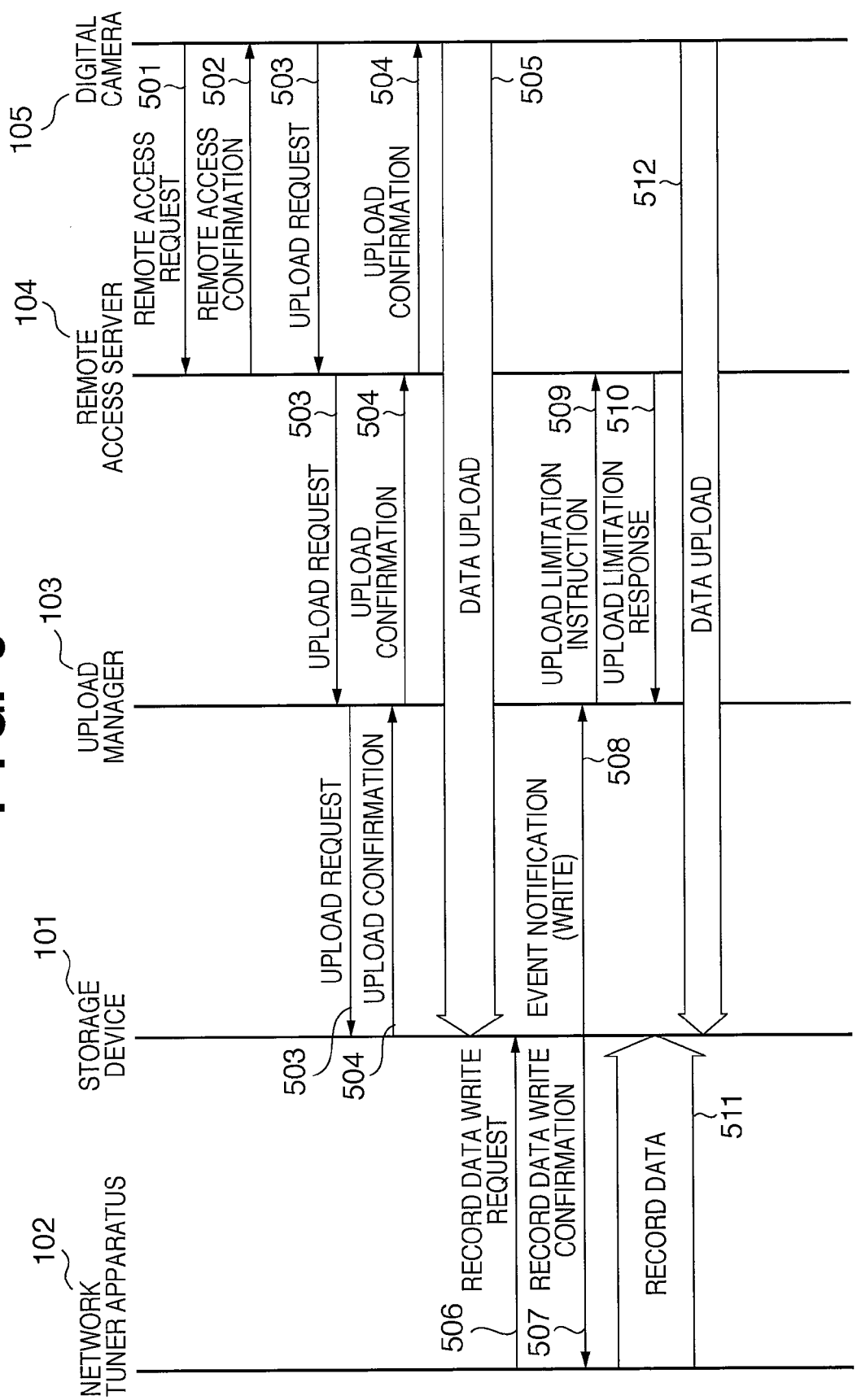
FIG. 5 is a sequence chart showing the overall sequence of the communication process of the devices included in the network system 100 upon receiving an upload process request from a digital camera 105.

FIG. 5 is a sequence chart showing the sequence of the communication process of the devices included in the network system 100 upon receiving an upload process request from the digital camera 105. FIGS. 6 to 10 are flowcharts illustrating the detailed sequences of the processes of the upload manager 103 and the remote access server 104.

The process sequence when the digital camera 105 sends an upload process request to the network system 100 will be described with reference to FIGS. 5 to 10.

In this embodiment, a case will particularly be explained in which the network tuner apparatus 102 sends a record data write request to the storage device 101 during data upload from the digital camera 105, and the process load of the storage device 101 increases.

To remote-access the network system 100 from the digital camera 105, the user performs the following operation.

First, before carrying the digital camera 105 outside the network system 100, the user acquires a remote access key, remote access information, and upload information from the remote access server 104 and stores them in the digital camera 105. If an adapter has a network access function, the pieces of information may be stored in the adapter.

The user operates the digital camera 105 to execute its remote upload function on the road.

In accordance with this operation, the digital camera 105 transmits a remote access request message containing remote access information to the remote access server 104 so that the process of the sequence chart in FIG. 5 starts.

In step S801 (FIG. 7), the remote access server 104 receives a remote access request message 501 (FIG. 5) via the Internet 106. Upon receiving the remote access request message 501, the remote access server 104 advances to step S802 (FIG. 7) to activate the remote access processing unit 401 and execute the following process.

The remote access processing unit 401 analyzes the remote access information received upon receiving the remote access request message 501 and executes authentication using the remote access key. The remote access processing unit 401 also creates a remote access session key. The created remote access session key is encrypted by the remote access key and transmitted to the digital camera 105 as a remote access confirmation message 502 (FIG. 5).

Upon receiving the remote access confirmation message 502 (FIG. 5) via the Internet 106, the digital camera 105 decrypts the remote access session key that is encrypted and included in the remote access confirmation message 502. The digital camera 105 thus extracts the remote access session key and starts encrypted communication using it.

At this time, an encrypted communication path (VPN: Virtual Private Network) using the remote access session key is formed between the digital camera 105 and the remote access server 104. That is, the communication between the digital camera 105 and the remote access server 104 is done using the encrypted communication path.

The digital camera 105 transmits an upload request message 503 (FIG. 5) to the upload manager 103 of the upload destination via the remote access server 104. In step S803, the remote access server 104 receives the upload request message 503 (FIG. 5) from the digital camera 105 and transfers it to the upload manager 103.

In step S601 (FIG. 6), the upload manager 103 receives the upload request message 503 (FIG. 5) via the remote access server 104. Upon receiving the upload request message 503, the upload manager 103 advances to step S602 (FIG. 6) to activate the upload terminal control unit 303 and execute the following process.

The upload terminal control unit 303 analyzes the upload request message 503 (FIG. 5), specifies information such as the storage device of the upload destination and the required size, and transmits the upload request message 503 (FIG. 5) to the storage device 101.

Upon receiving the upload request message 503 (FIG. 5) from the upload manager 103, the network control unit 203 of the storage device 101 opens a port dedicated for upload. The network control unit 203 also transmits an upload confirmation message 504 (FIG. 5) to the upload manager 103.

In step S603, the upload manager 103 receives the upload confirmation message 504 (FIG. 5) from the storage device 101. In step S604, the upload manager 103 transmits the upload confirmation message 504 (FIG. 5) to the digital camera 105 via the remote access server 104. At this time, the remote access server 104 transfers the upload confirmation message 504 (FIG. 5) to the digital camera 105 in step S804.

Upon receiving the upload confirmation message 504 (FIG. 5) via the Internet 106, the digital camera 105 starts the upload process and transmits data 505 (FIG. 5).

In steps S605 and S805, the upload manager 103 and the remote access server 104 transfer the transmitted data 505 (FIG. 5).

Upon receiving the data 505 from the digital camera 105 by the upload process, the network control unit 203 of the storage device 101 activates the file control unit 204 to store the data.

Assume that during transfer of the data 505 by the upload process, the network tuner apparatus 102 starts reserved recording and transmits a record data write request message 506 (FIG. 5) to the storage device 101.

Upon receiving the record data write request message 506 (FIG. 5), the network control unit 203 of the storage device 101 transmits a record data write confirmation message 507 (FIG. 5) to the network tuner apparatus 102. After that, the access information monitoring unit 202 and the internal load monitoring unit 201 are activated. Then, an event notification (write) message 508 containing access information and process load information as parameters is transmitted to the upload manager 103.

The event notification (write) message 508 can be transmitted using, for example, SNMP (Simple Network Management Protocol) agent notification. The SNMP agent notification is set in the storage device 101 in advance to execute the transmission using the SNMP agent notification.

During transfer of the data 505 (FIG. 5), the upload manager 103 is monitoring the presence/absence of reception of an event notification (write) message in step S606. Hence, upon receiving the event notification (write) message 508 (FIG. 5), the upload manager 103 activates the storage access information monitoring unit 302 in step S607 to execute the following process.

The storage access information monitoring unit 302 analyzes details of the event notification (write) message 508 and determines whether the device which has transmitted the event notification (write) message 508 has a network recording function. If it is determined that the device has the network recording function, the process advances to step S701 (FIG. 6) to activate the storage load monitoring unit 301.

The storage load monitoring unit 301 analyzes details of the event notification (write) message 508 and calculates the process load of the storage device 101. The storage load monitoring unit 301 determines whether the calculated process load is larger than a predetermined threshold value.

Note that the process load of the storage device 101 includes a network load to process network packets, and the load of the control device (CPU/MPU) for, for example, the file operation, server program, and encryption process.

If it is determined in step S701 that the calculated process load is larger than the predetermined threshold value, the process advances to step S702. In step S702, the upload manager 103 instructs the remote access server 104 to limit upload from the upload terminal (digital camera 105). For this instruction, the storage load monitoring unit 301 calculates a band limit value that is a target value in reducing the band from the upload terminal (digital camera 105) to make the calculated process load smaller than the threshold value, and activates the remote access server control unit 304.

The remote access server control unit 304 acquires, from the upload terminal control unit 303, the data of the upload terminal (digital camera 105) which is executing the upload. The upload manager 103 transmits, to the remote access server 104, an upload limitation instruction message 509 (FIG. 5) for the upload terminal (digital camera 105) together with the band limit value.

During transfer of the data 505 (FIG. 5), the remote access server 104 is monitoring the presence/absence of reception of the upload limitation instruction message 509 in step S806. Hence, upon receiving the upload limitation instruction message 509 (FIG. 5), the remote access server 104 advances to step S807. The remote access processing unit 401 analyzes details of the upload limitation instruction message 509 (FIG. 5). It is determined based on the result of analysis of the upload limitation instruction message 509 (FIG. 5) whether a temporary buffer memory capable of temporarily storing the uploaded data 505 (FIG. 5) can be ensured in the remote access server 104.

If the remote access server 104 determines in step S807 that the temporary buffer memory can be ensured, the process advances to step S808. In step S808, the remote access server 104 stores the data 505 (FIG. 5) from the upload terminal (digital camera 105) in the temporary buffer memory, thereby suppressing the transfer amount to the storage device 101.

Figure 8:
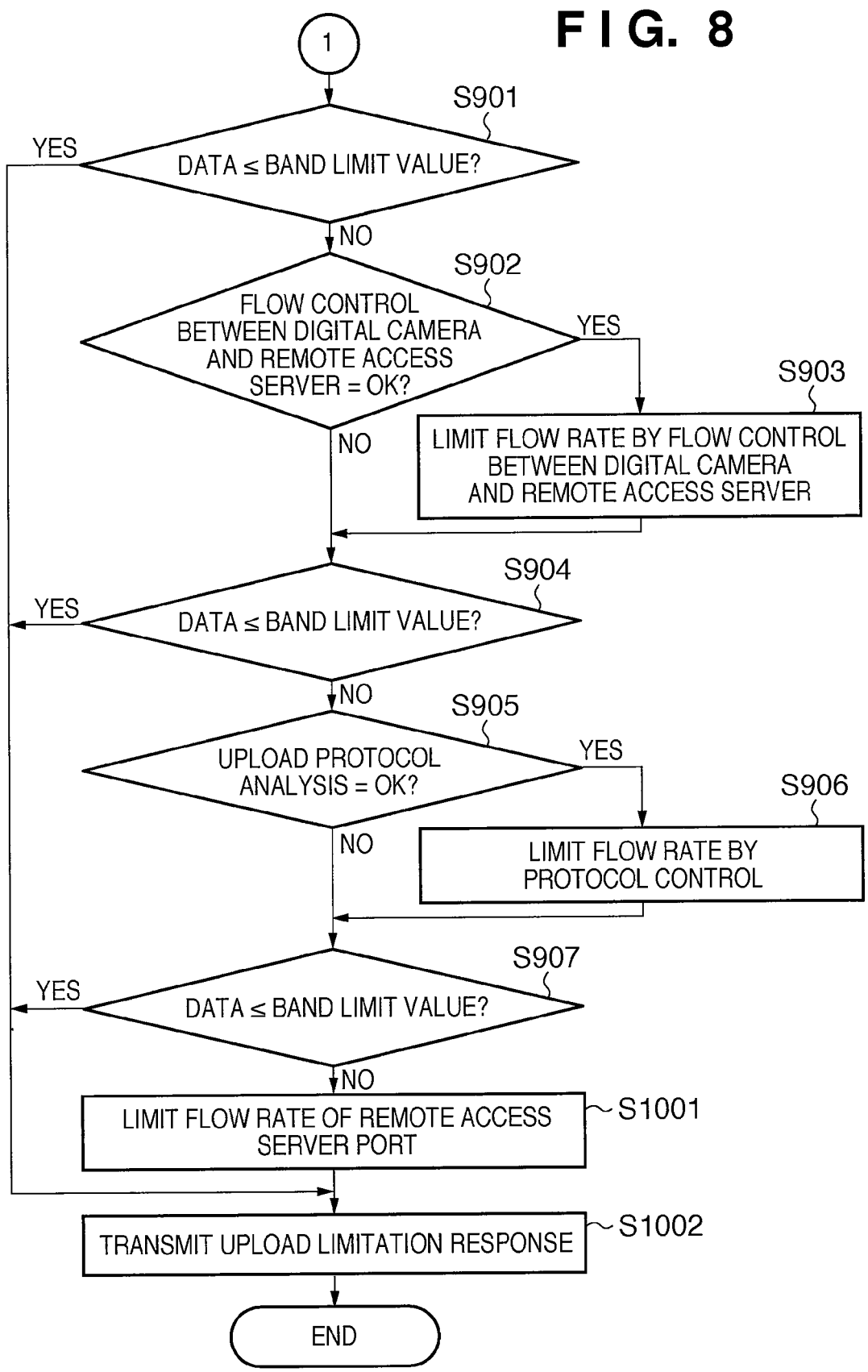
FIG. 8 is a flowchart illustrating the detailed sequence of the process of the remote access server 104.

The process advances to step S901 (FIG. 8). The remote access processing unit 401 of the remote access server 104 activates the remote access communication analyzing unit 403. The remote access communication analyzing unit 403 determines whether the data band from the upload terminal (digital camera 105) has fallen within the band limit value received together with the upload limitation instruction message 509 (FIG. 5). If it is determined that the data band from the digital camera 105 has not fallen within the band limit value yet, the process advances to step S902 (FIG. 8).

In step S902, the remote access processing unit 401 of the remote access server 104 determines whether flow control of the data 505 has been established in the encrypted communication path between the upload terminal (digital camera 105) and the remote access server 104.

If it is determined in step S902 that flow control of the data 505 has been established, the process advances to step S903, and the remote access server 104 mainly executes flow control of the data 505.

In step S904, the remote access communication analyzing unit 403 of the remote access server 104 determines whether the data band from the digital camera 105 has fallen within the band limit value received together with the upload limitation instruction message 509.

If it is determined in step S904 that the data band has fallen within the band limit value, the process advances to step S1002 (FIG. 8). Otherwise, the process advances to step S905.

In step S905, the remote access processing unit 401 of the remote access server 104 determines whether the remote access communication analyzing unit 403 has successfully analyzed the upload protocol in the session layer of the OSI hierarchical model. If it is determined in step S905 that the upload protocol analysis has succeeded, the process advances to step S906. In step S906, the transmission amount of the data 505 from the digital camera 105 is limited by, for example, inhibiting reception response return or rejecting reception under the control of the upload protocol.

In step S907, the remote access communication analyzing unit 403 of the remote access server 104 determines again whether the data band has fallen within the band limit value received together with the upload limitation instruction message 509. If it is determined in step S907 that the data band has fallen within the band limit value, the process advances to step S1002 (FIG. 8). Otherwise, the process advances to step S1001 (FIG. 8).

In step S1001, the remote access port control unit 404 of the remote access server 104 limits the packet flow to the network port connected to the digital camera 105 that is the control target of the upload limitation instruction message 509.

In step S1002, the remote access processing unit 401 of the remote access server 104 executes various kinds of processes according to the upload limitation instruction message 509 from the upload manager 103. The remote access server 104 returns an upload limitation response message 510 (FIG. 5) to the upload manager 103.

Upon receiving the upload limitation response message 510 from the remote access server 104, the remote access server control unit 304 of the upload manager 103 finishes the upload limitation process for the digital camera 105 in step S703.

After the above-described process, the network tuner apparatus 102 transmits record data 511 (FIG. 5) to the storage device 101. The amount of data uploaded from the digital camera 105 is limited during transmission of the record data 511 (512 in FIG. 5).

As is apparent from the above description, execution of the upload manager according to this embodiment allows achieving the object of the present invention and obtaining the following unique effects.

In acquiring information such as the process load from the storage device 101, implementation can be simplified, and the application range can be widened by using the standard protocol SNMP.

Since the upload manager 103 in the network system 100 runs on the router where the remote access server 104 is operating, the upload manager 103 can always be operated without power-off.

Since the upload manager 103 in the network system 100 runs outside the storage device 101, the process load of the storage device 101 can be reduced.

Second Embodiment

The second embodiment of the present invention will be described next with reference to the accompanying drawings. In this embodiment, a network tuner apparatus writes record data in a storage device, and a network player apparatus reads out record data from the storage device. Control of an upload process executed in this high process load state of the storage device will be described.

1. Arrangement of Network System

Figure 9:
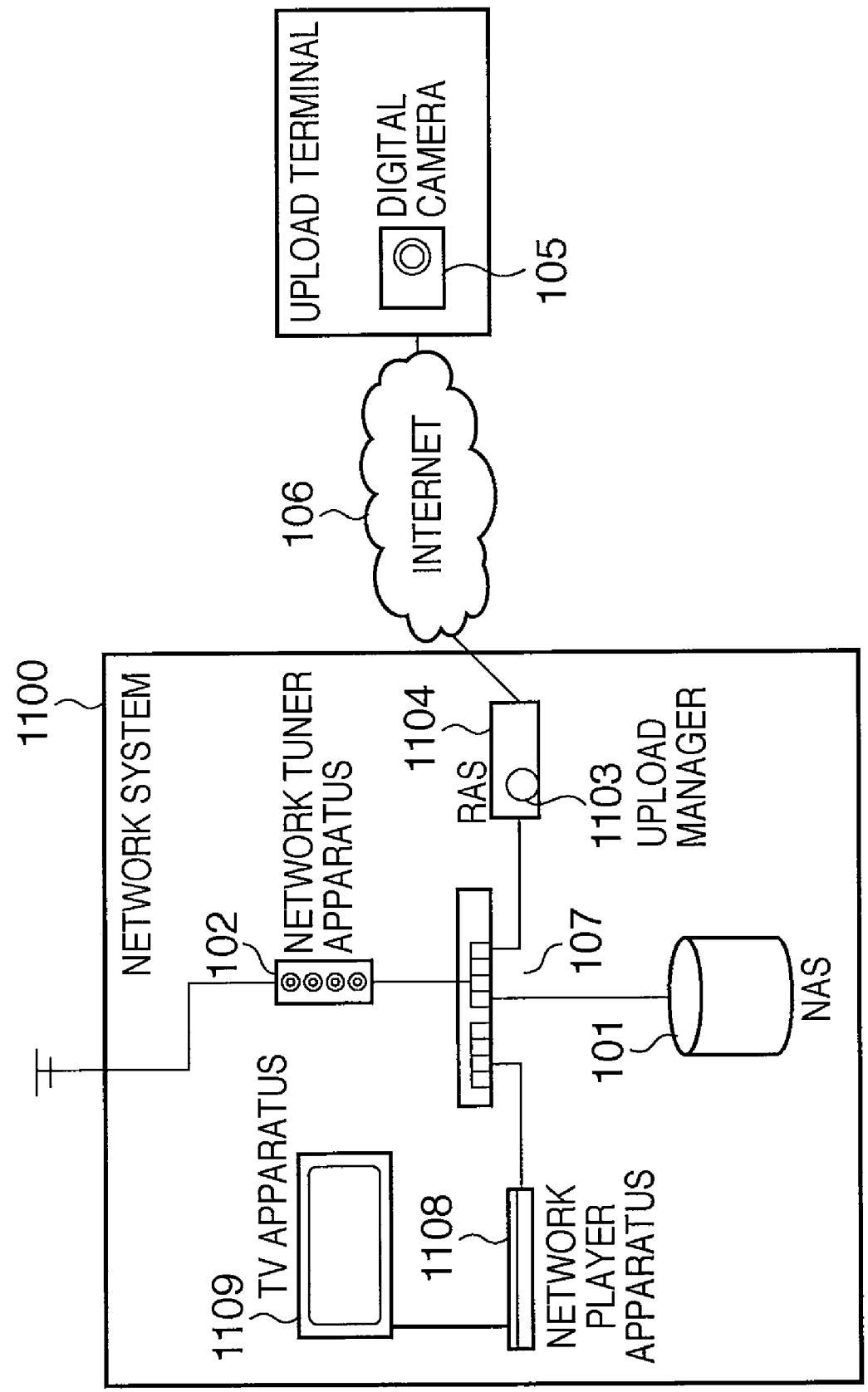
FIG. 9 is a view showing the arrangement of a network system 1100 to which a remote access server having a control program (upload manager) for implementing a control method according to the second embodiment of the present invention is connected.
Figure 10:
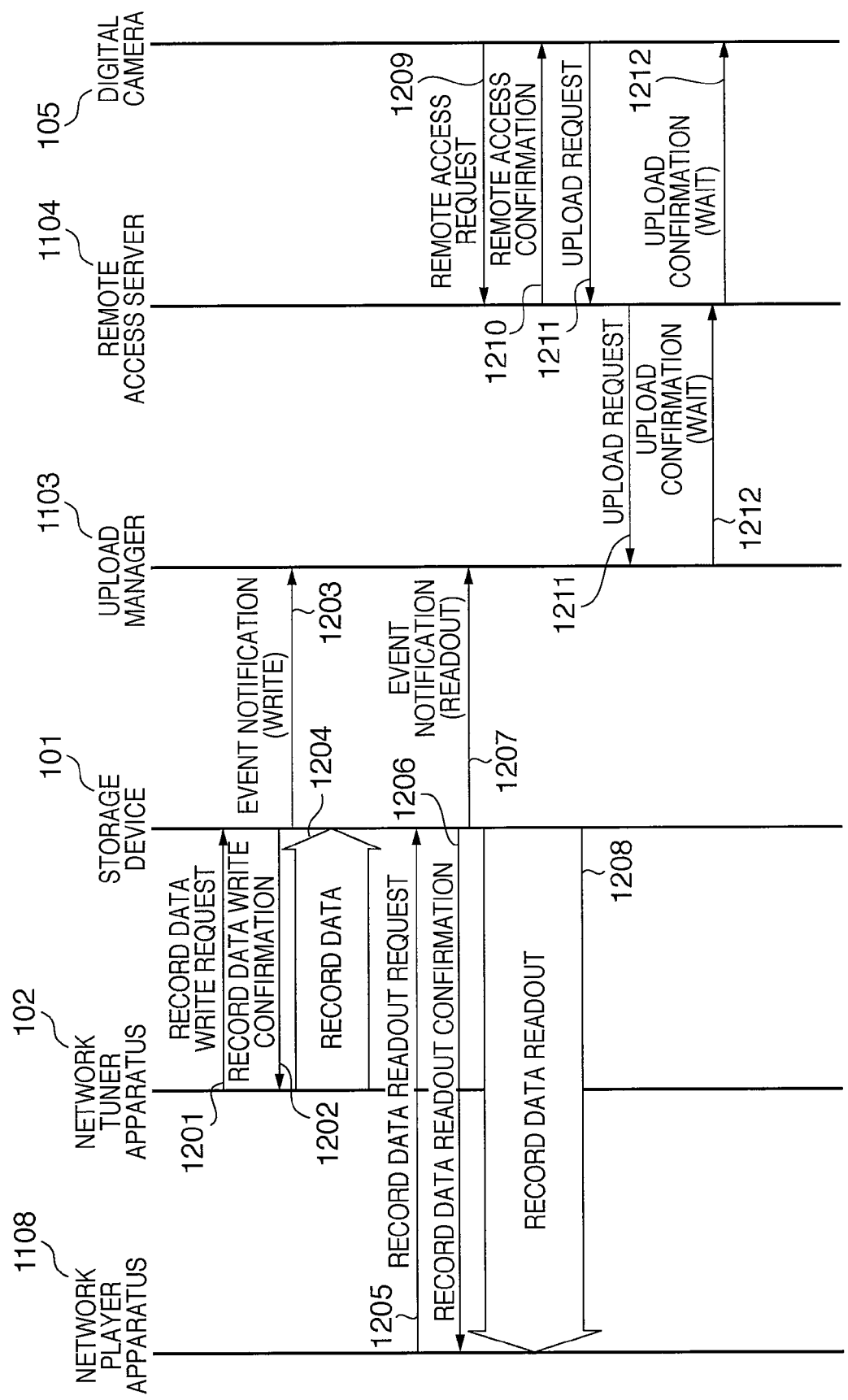
FIG. 10 is a sequence chart showing the sequence of the communication process of the devices included in the network system 1100 upon receiving an upload process request from a digital camera 105.

FIG. 9 is a view showing the arrangement of a network system 1100 to which a remote access server having a control program (upload manager) for implementing a control method according to the present invention is connected. As in FIG. 1, the network system 1100 is designed to make a digital camera 105 carried outside the network connectable to the remote access server via Internet 106.

A storage device 101 is connectable to a network 107 alone. A network tuner apparatus 102 has a function of transferring a TV radio image to the storage device 101 via the network 107 as record data.

An upload manager 1103 monitors the process load of the storage device 101 and, when the digital camera 105 uploads data via a remote access server 1104, controls the upload process.

The remote access server 1104 manages remote access from the digital camera 105 or the like. The remote access management function is implemented on a router which has a firewall function of separately managing the Internet 106 (external network) and the network 107 (internal network).

The digital camera 105 (including a normal digital camera having a network connection adapter) can remote-access the network system 1100.

A network player apparatus 1108 receives medium data from the storage device 101 via the network 107 and executes decoding and rendering, thereby sending video and sound signals to a TV apparatus 1109. The TV apparatus 1109 plays back the video image and sound.

2. Functional Arrangements of Devices

The functional arrangements of the storage device 101, upload manager 1103, and remote access server 1104 are the same as in FIGS. 2 to 4 of the first embodiment, and a description thereof will not be repeated.

3. Sequence of Communication Process in Network System 1100

Figure 12:
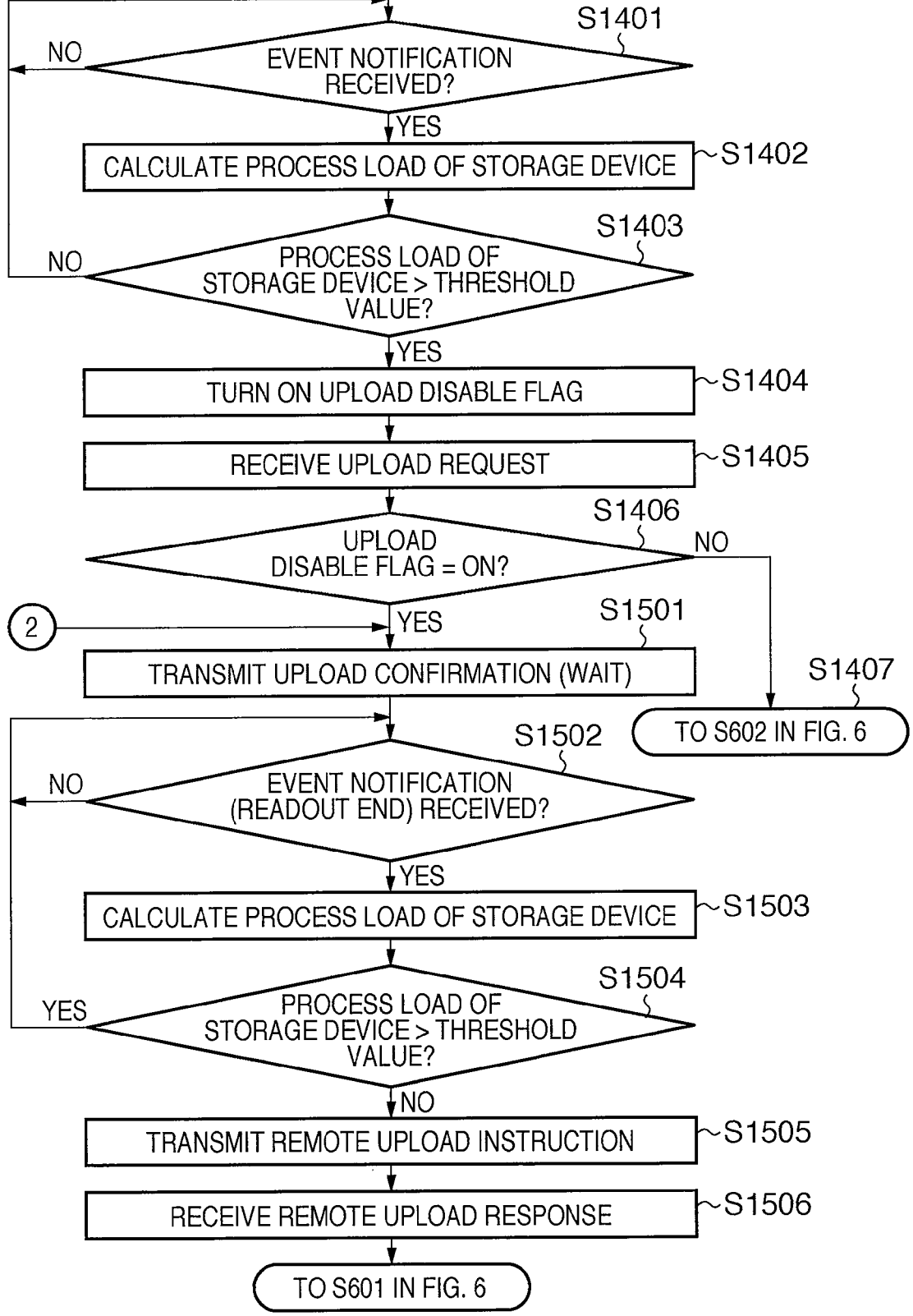
FIG. 12 is a flowchart illustrating the detailed sequence of the process of an upload manager 1103.
Figure 13:
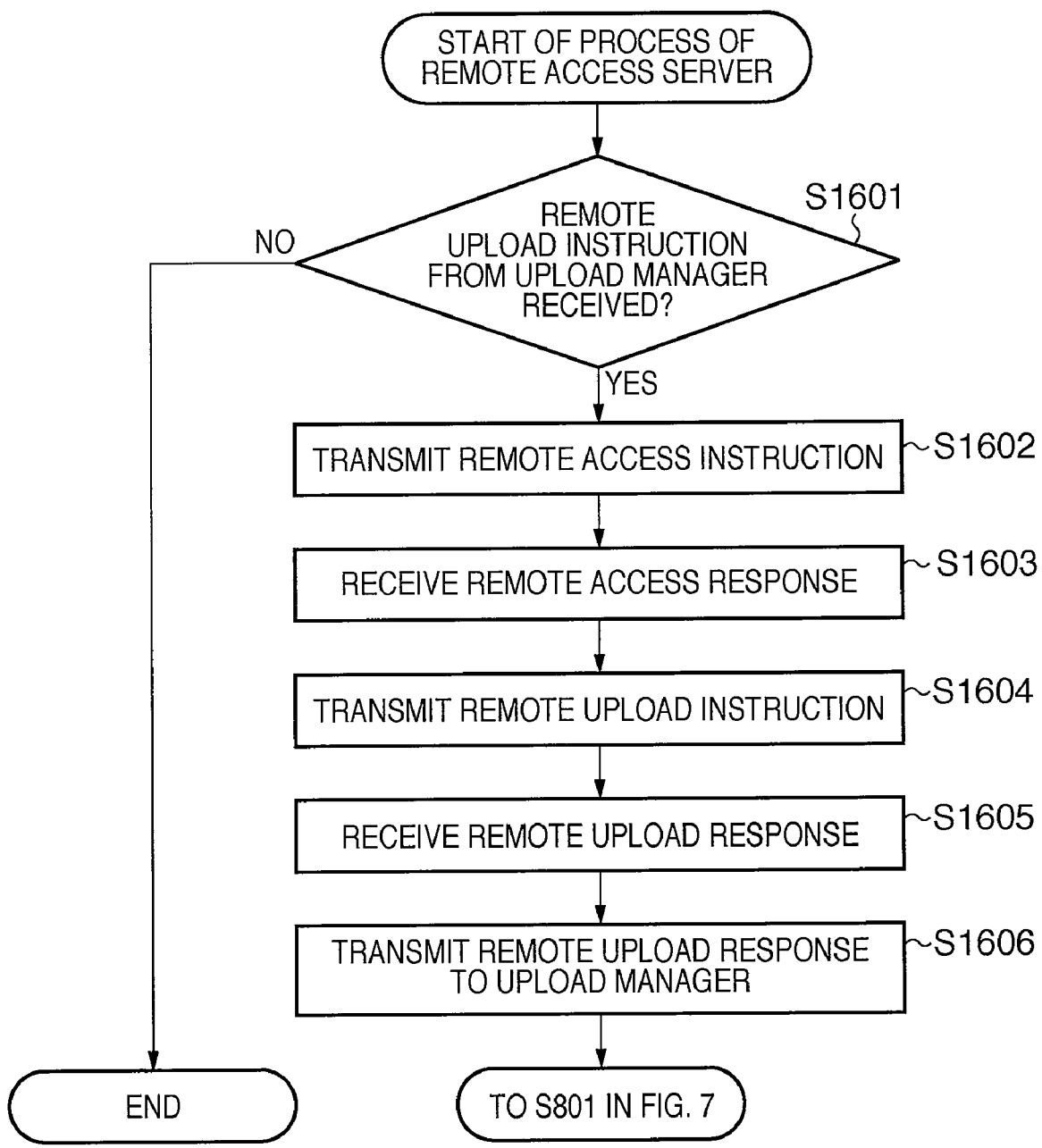
FIG. 13 is a flowchart illustrating the detailed sequence of the process of a remote access server 1104.
Figure 14:
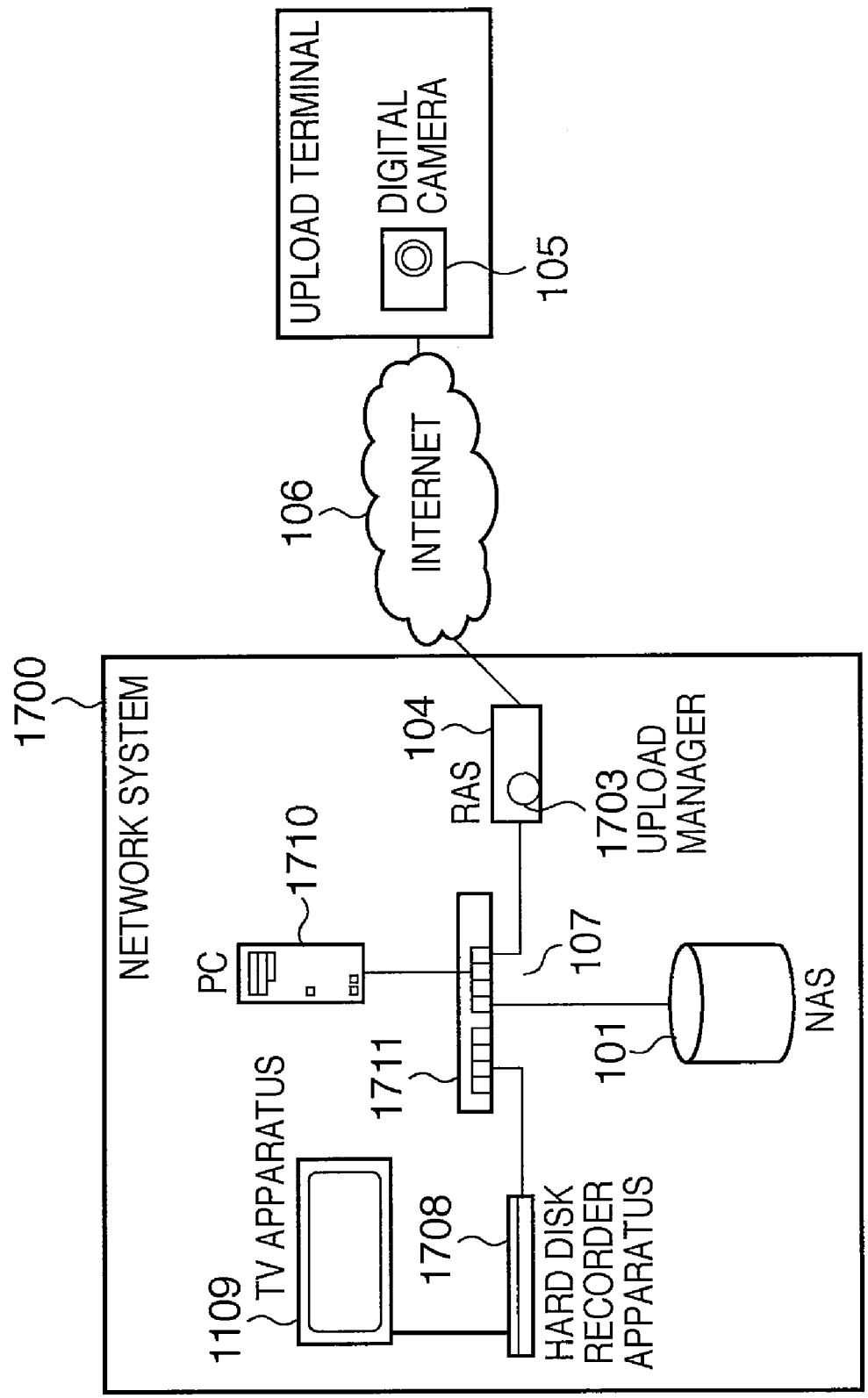
FIG. 14 is a view showing the arrangement of a network system 1700 to which a remote access server having a control program (upload manager) for implementing a control method according to the third embodiment of the present invention is connected.
Figure 15:
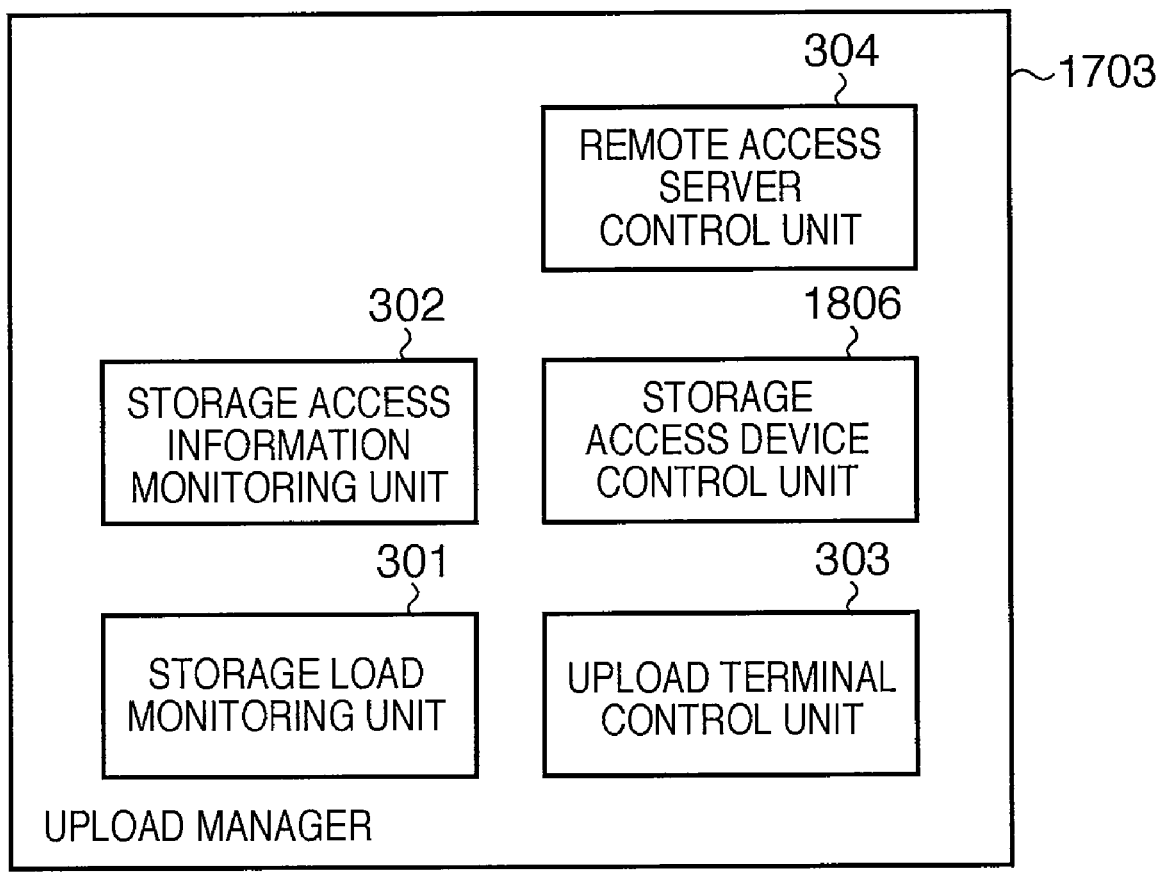
FIG. 15 is a block diagram showing the functional arrangement of an upload manager 1703.
Figure 16:
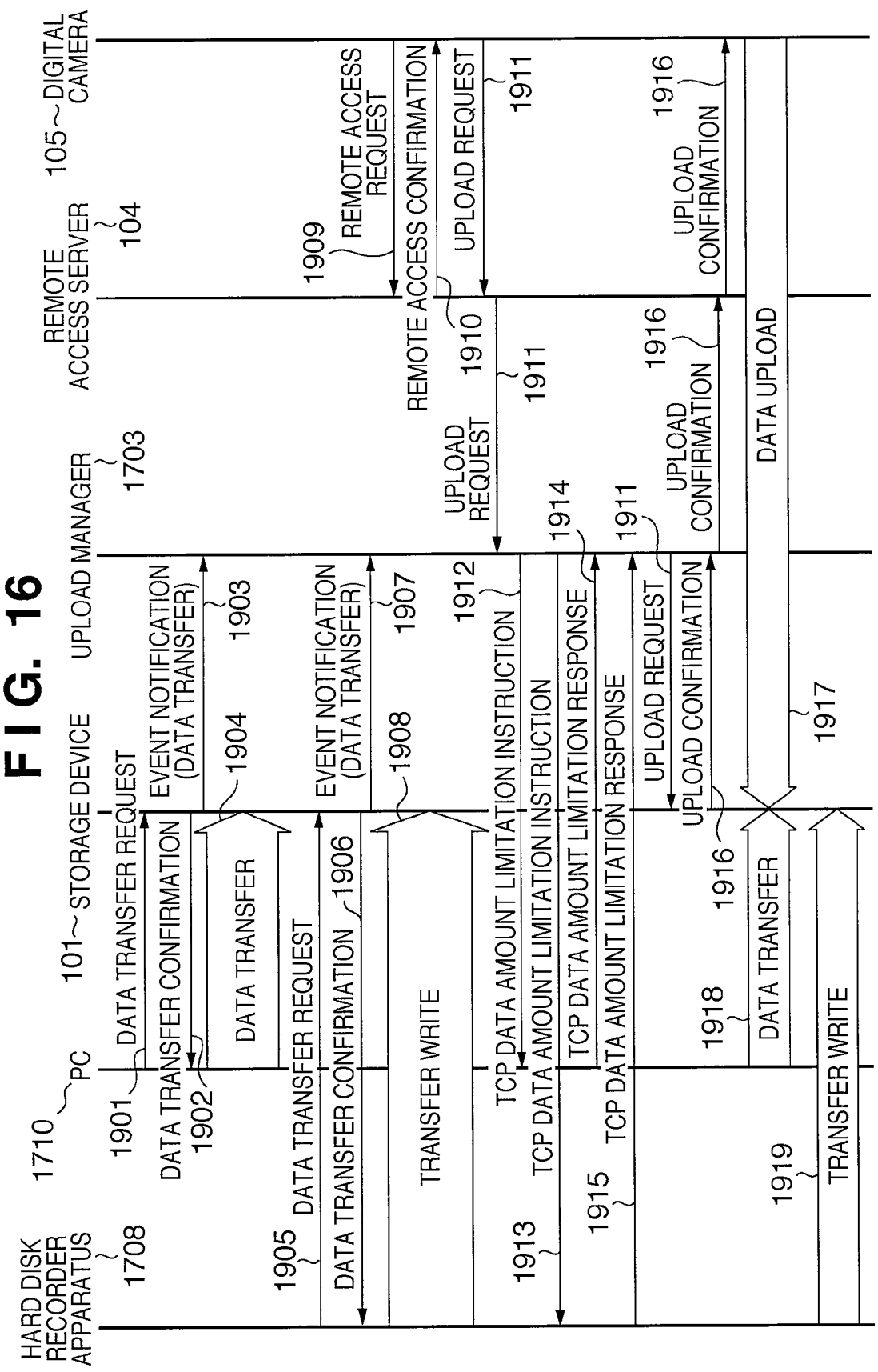
FIG. 16 is a sequence chart showing the sequence of the communication process of the devices included in the network system 1700 upon receiving an upload process request from a digital camera 105.

FIGS. 12 and 13 are sequence charts showing the sequence of the communication process of the devices included in the network system 1100 upon receiving an upload process request from the digital camera 105. FIGS. 14 to 16 are flowcharts illustrating the detailed sequences of the processes of the upload manager 1103 and the remote access server 1104.

The process sequence when the digital camera 105 sends an upload process request to the network system 1100 will be described with reference to FIGS. 12 to 16.

In this embodiment, assume that the record data write in the storage device 101 by the network tuner apparatus 102 and the record data readout by the network player apparatus 1108 are already being executed when the upload process request is received.

To remote-access the network system 1100 from the digital camera 105, the user performs the following operation.

First, before carrying the digital camera 105 outside the network system 1100, the user acquires a remote access key, remote access information, and upload information from the remote access server 1104 and stores them in the digital camera 105. If an adapter has a network access function, the pieces of information may be stored in the adapter.

Assume that the network tuner apparatus 102 transmits a record data write request message 1201 (FIG. 10) to the storage device 101 before the user operates the digital camera 105 to execute its remote upload function on the road.

Upon receiving the record data write request message 1201 (FIG. 10), a network control unit 203 of the storage device 101 activates an access information monitoring unit 202 and an internal load monitoring unit 201, as in the first embodiment. Then, an event notification (write) message 1203 containing access information and process load information as parameters is transmitted to the upload manager 1103 that is a preset SNMP transmission destination.

The network control unit 203 of the storage device 101 also transmits a record data write confirmation message 1202 (FIG. 10) to the network tuner apparatus 102.

Upon receiving the record data write confirmation message 1202 (FIG. 10) from the storage device 101, the network tuner apparatus 102 starts transmitting record data 1204.

Upon receiving the record data 1204 from the network tuner apparatus 102, the network control unit 203 of the storage device 101 activates a file control unit 204 to store the record data 1204.

On the other hand, in step S1401 (FIG. 12), a storage access information monitoring unit 302 of the upload manager 1103 monitors whether the event notification (write) message 1203 from the storage device 101 has been received.

If it is determined in step S1401 that the event notification (write) message 1203 has been received, the process advances to step S1402. In step S1402, details of the event notification (write) message 1203 are analyzed. Then, a storage load monitoring unit 301 is activated to calculate the state of process load of the storage device 101.

In step S1403, the storage load monitoring unit 301 determines whether the process load state of the storage device 101 is larger than a predetermined threshold value. If it is determined in step S1403 that the process load state of the storage device 101 is smaller than the predetermined threshold value, the process returns to step S1401 to wait for transmission of the next event notification (write). If it is determined that the process load state of the storage device 101 is larger than the predetermined threshold value, the process advances to step S1404.

Assume that during transmission of the record data 1204, the network player apparatus 1108 transmits a record data readout request message 1205 (FIG. 10) to the storage device 101.

Upon receiving the record data readout request message 1205 from the network player apparatus 1108, the network control unit 203 of the storage device 101 activates the access information monitoring unit 202 and the internal load monitoring unit 201. Then, an event notification (readout) message 1207 (FIG. 10) containing access information and process load information as parameters is transmitted to the upload manager 1103 that is a preset SNMP transmission destination.

The network control unit 203 of the storage device 101 also transmits a record data readout confirmation message 1206 (FIG. 10) to the network player apparatus 1108. The network control unit 203 activates the file control unit 204 to prepare for record data readout from the storage device 101.

Upon receiving the record data readout confirmation message 1206 from the storage device 101, the network player apparatus 1108 reads out record data 1208 (FIG. 10) from the storage device 101. The network player apparatus 1108 also decodes and renders the record data 1208 (FIG. 10), thereby transmitting video and sound signals to the TV apparatus 1109.

Upon receiving the video and sound signals from the network player apparatus 1108, the TV apparatus 1109 displays or plays back the video and sound signals.

On the other hand, in the upload manager 1103, the storage access information monitoring unit 302 serving as an SNMP server receives the event notification (readout) message 1207, and the process advances to step S1402.

In step S1402, details of the event notification (readout) message 1207 are analyzed. Then, the storage load monitoring unit 301 is activated to calculate the state of process load of the storage device 101.

In step S1403, the storage load monitoring unit 301 determines whether the process load state of the storage device 101 is larger than a predetermined threshold value. If it is determined in step S1403 that the process load state of the storage device 101 is smaller than the predetermined threshold value, the process returns to step S1401 to wait for transmission of the next event notification (write). If it is determined in step S1403 that the process load state of the storage device 101 is larger than the predetermined threshold value, the process advances to step S1404 to turn on an upload disable flag from the upload terminal (digital camera 105).

Assume that after the process in step S1404, the user operates the digital camera 105 to execute its remote upload function on the road.

The process until the digital camera 105 executes the remote upload function and transmits an upload request message 1211 to the upload manager 1103 is the same as in the first embodiment, and a description thereof will not be repeated.

In step S1405 (FIG. 12), an upload terminal control unit 303 of the upload manager 1103 receives the upload request message 1211.

In step S1406 (FIG. 12), the upload terminal control unit 303 determines whether the upload disable flag is ON.

Figure 6:
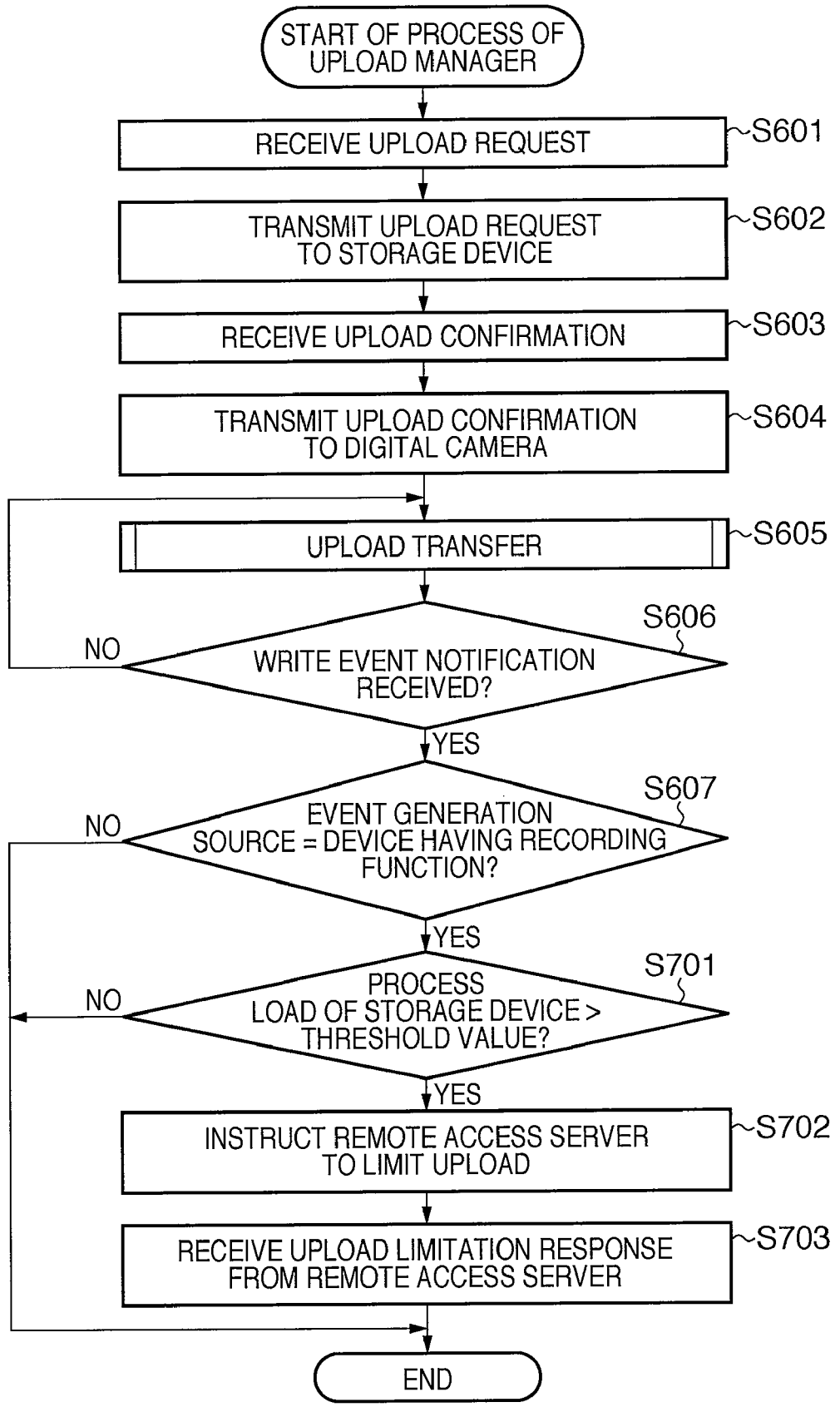
FIG. 6 is a flowchart illustrating the detailed sequence of the process of the upload manager 103.

If it is determined in step S1406 that the upload disable flag is OFF, the process advances to step S1407 and then to step S602 in FIG. 6.

On the other hand, if it is determined in step S1406 that the upload disable flag is ON, the process advances to step S1501 (FIG. 12).

In step S1501 (FIG. 12), the upload terminal control unit 303 of the upload manager 1103 transmits an upload confirmation (wait) message 1212 (FIG. 10) to the digital camera 105 via the remote access server 1104. Note that the upload confirmation (wait) message 1212 (FIG. 10) notifies the digital camera that the upload manager rejects upload (stops data transmission) in effect.

Upon receiving the upload confirmation (wait) message 1212 (FIG. 10) via the Internet 106, the upload terminal (digital camera 105) shifts to a remote upload wait state.

Figure 11:
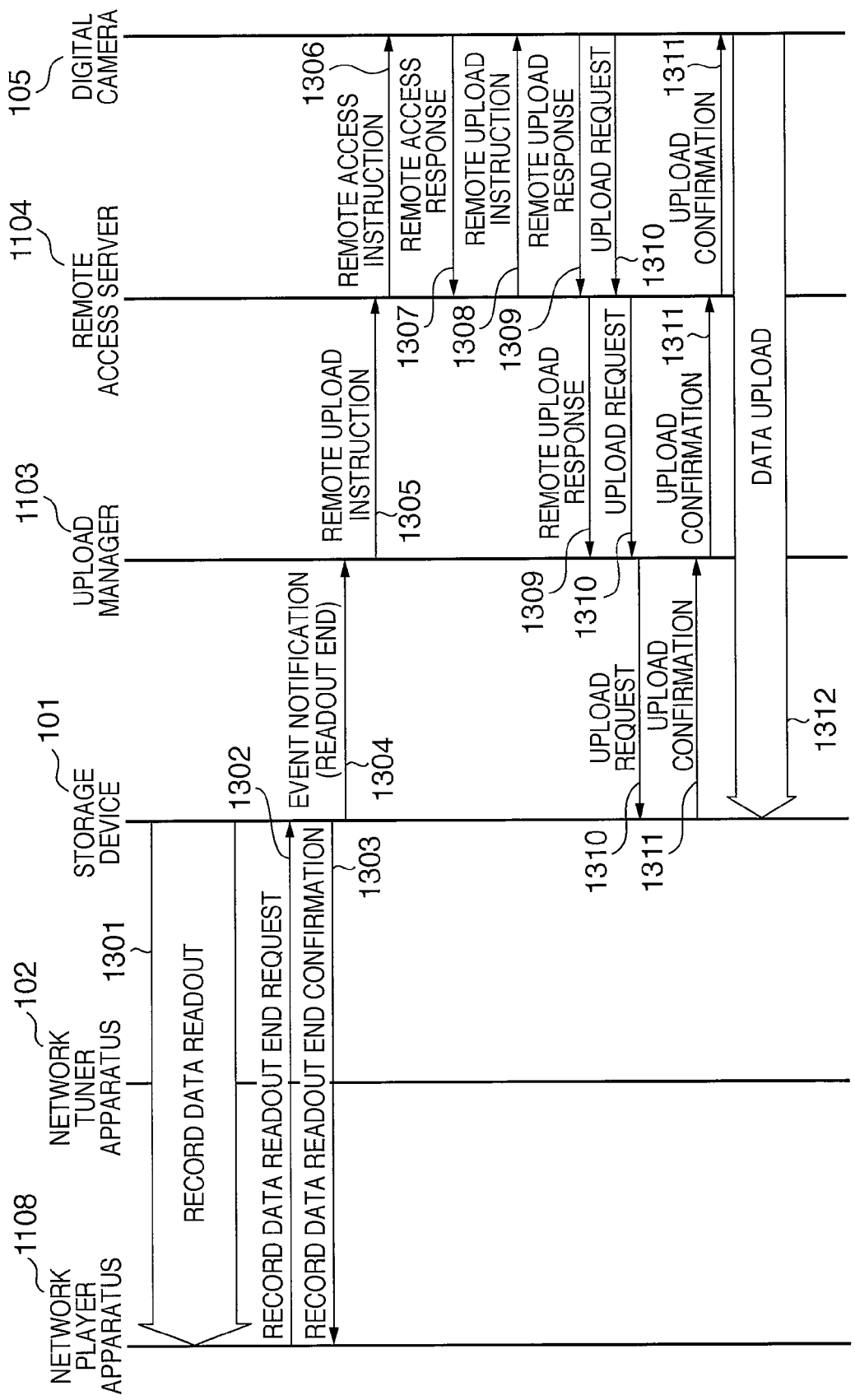
FIG. 11 is a sequence chart showing the sequence of the communication process of the devices included in the network system 1100 upon receiving an upload process request from the digital camera 105.

Assume that when the digital camera 105 is in, the remote upload wait state, viewing of record data 1301 (FIG. 11) on the network player apparatus 1108 finishes, and a record data readout end request message 1302 (FIG. 11) is transmitted to the storage device 101.

Upon receiving the record data readout end request message 1302 (FIG. 11) from the network player apparatus 1108, the network control unit 203 of the storage device 101 activates the access information monitoring unit 202 and the internal load monitoring unit 201. Then, an event notification (readout end) 1304 (FIG. 11) containing access information and process load information as parameters is transmitted to the upload manager 1103 that is a preset SNMP transmission destination.

The network control unit 203 of the storage device 101 also transmits a record data readout end confirmation message 1303 (FIG. 11) to the network player apparatus 1108.

Upon receiving the record data readout end confirmation message 1303 (FIG. 11) from the storage device 101, the network player apparatus 1108 finishes the process.

After transmitting the upload confirmation (wait) message 1212 (FIG. 10), the upload manager 1103 monitors the presence/absence of reception of the event notification (readout end) 1304 (FIG. 11) in step S1502.

If the upload manager 1103 determines that the storage access information monitoring unit 302 serving as an SNMP server has received the event notification (readout end) 1304 from the storage device 101, the process advances to step S1503.

In step S1503, details of the event notification (readout end) 1304 are analyzed. Then, the storage load monitoring unit 301 is activated to calculate the state of process load of the storage device 101. In step S1504, the storage load monitoring unit 301 determines whether the process load state of the storage device 101 has not exceeded (is smaller than) the predetermined threshold value.

If it is determined in step S1504 that the process load state of the storage device 101 is still larger than the predetermined threshold value, the process returns to step S1502. If it is determined that the process load state of the storage device 101 has not exceeded (is smaller than) the predetermined threshold value, the process advances to step S1505.

In step S1505, the storage load monitoring unit 301 of the upload manager 1103 activates a remote access server control unit 304. Then, a remote upload instruction message 1305 (FIG. 11) as a remote upload start instruction is transmitted to the digital camera 105 in the remote upload wait state via the remote access server 1104.

On the other hand, in step S1601, the remote access server 1104 waits for the remote upload instruction message 1305 (FIG. 11) from the upload manager 1103.

When an upload manager communication unit 402 receives the remote upload instruction message 1305 (FIG. 11) from the upload manager 1103, a remote access processing unit 401 of the remote access server 1104 executes the following process.

In step S1602, the remote access processing unit 401 transmits a remote access instruction message 1306 (FIG. 11) to the digital camera 105.

Upon receiving the remote access instruction message 1306 (FIG. 11) from the remote access server 1104, the digital camera 105 returns a remote access response message 1307 (FIG. 11) to the remote access server 1104.

As a result, in step S1603, the remote access server 1104 receives the remote access response message 1307 (FIG. 11) from the digital camera 105. In step S1604, the remote access processing unit 401 of the remote access server 1104 transmits a remote upload instruction message 1308 (FIG. 11) to the digital camera 105.

Upon receiving the remote upload instruction message 1308 from the remote access server 1104, the digital camera 105 returns a remote upload response message 1309 (FIG. 11) to the remote access server 1104. After that, the digital camera 105 executes the upload process.

In step S1605, the remote access processing unit 401 of the remote access server 1104 receives the remote upload response message 1309 (FIG. 11) from the digital camera 105.

In step S1606, the remote access processing unit 401 transmits the remote upload response message 1309 to the upload manager 1103.

Figure 7:
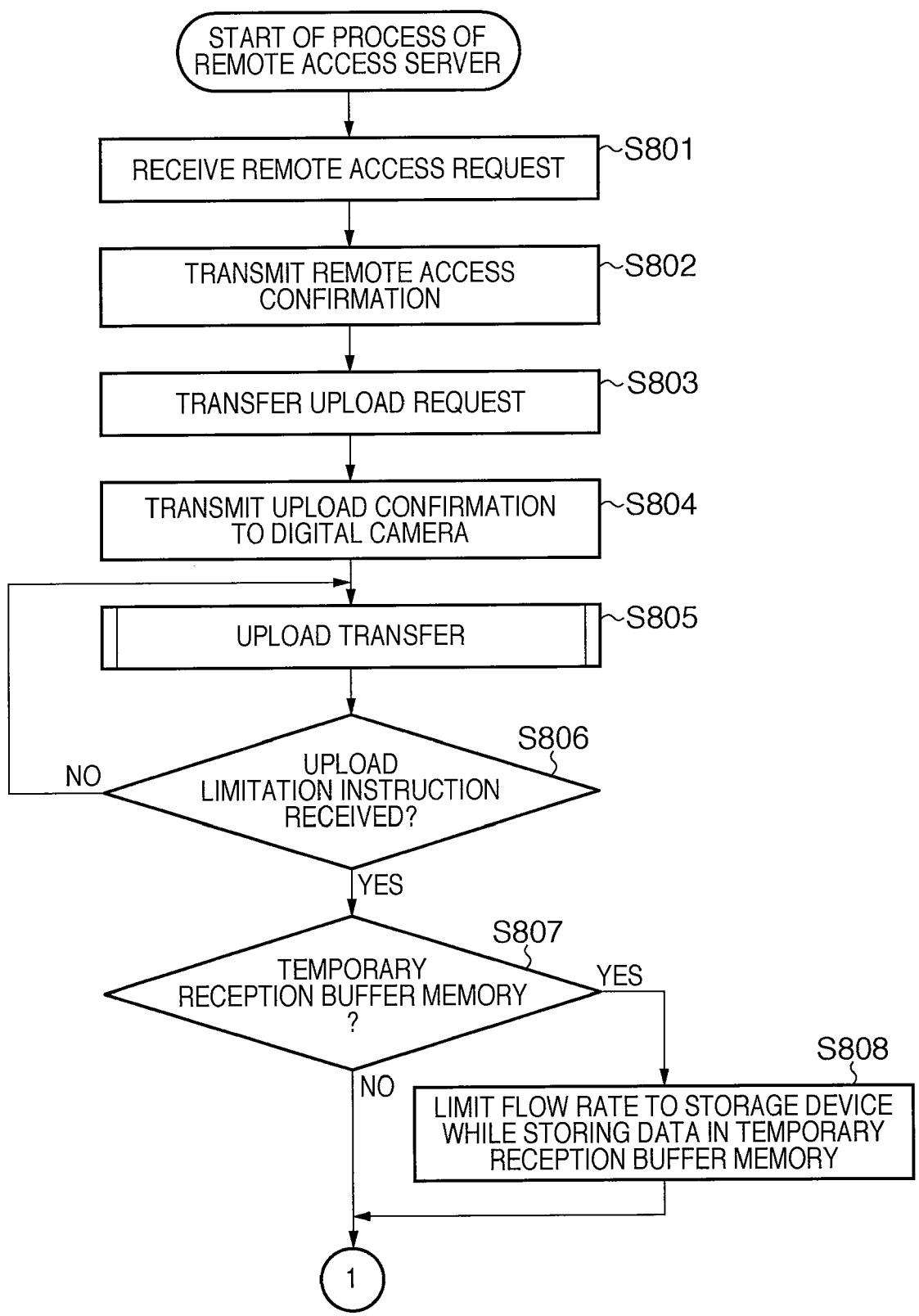
FIG. 7 is a flowchart illustrating the detailed sequence of the process of the remote access server 104.

The process in the remote access server 1104 after transmitting the remote upload response message 1309 is the same as that from step S801 in FIG. 7, and a description thereof will not be repeated.

In step S1506, the upload manager 1103 receives the remote upload response message 1309 from the remote access server 1104. The process in the upload manager 1103 after receiving the remote upload response message 1309 is the same as that from step S601 in FIG. 6, and a description thereof will not be repeated.

As is apparent from the above description, execution of the upload manager according to this embodiment allows achieving the object of the present invention and obtaining the following unique effects.

Even if an upload request is received when the process load of the storage device of the upload destination is high, it is possible to notify the upload terminal (digital camera 105) of upload rejection. This enables reduction of the power consumption of the upload terminal (digital camera 105).

Third Embodiment

The third embodiment of the present invention will be described next with reference to the accompanying drawings. In this embodiment, a case will be described in which data is uploaded while a plurality of devices in a network are accessing a storage device. In this embodiment, the upload process from a digital camera has priority over the devices that are accessing the storage device.

1. Arrangement of Network System

FIG. 14 is a view showing the arrangement of a network system 1700 to which a remote access server having a control program (upload manager) for implementing a control method according to this embodiment is connected. As in FIGS. 1 and 11, the network system 1700 is designed to make a digital camera 105 carried outside the network connectable to a remote access server 104 via Internet 106.

A storage device 101 is connectable to a network 107 alone. An upload manager 1703 monitors the process load of the storage device 101 and, when the digital camera 105 uploads data via the remote access server 104, controls the process for the storage device 101.

The remote access server 104 manages remote access from the digital camera 105 or the like. The remote access management function is implemented on a router which has a firewall function of separately managing the Internet 106 (external network) and the network 107 (internal network).

The digital camera 105 (including a normal digital camera having a network connection adapter) can remote-access the network system 1700.

A TV apparatus 1109 plays back a video image and sound. A hard disk recorder apparatus 1708 receives and records TV broadcasting from the TV apparatus 1109.

Reference numeral 1710 denotes a personal computer (PC); and 1711, a switching hub device which executes network connection.

2. Functional Arrangements of Devices

Of the devices included in the network system 1700, the storage device 101 and the remote access server 104 have the same functional arrangements as in the first embodiment, and a description thereof will not be repeated.

FIG. 15 is a block diagram showing the functional arrangement of the upload manager 1703. The upload manager 1703 has a function 1806 in addition to functions 301 to 304.

The storage access device control unit 1806 controls the process of a device which accesses the storage device 101.

3. Sequence of Communication Process in Network System 1700

Figure 20:
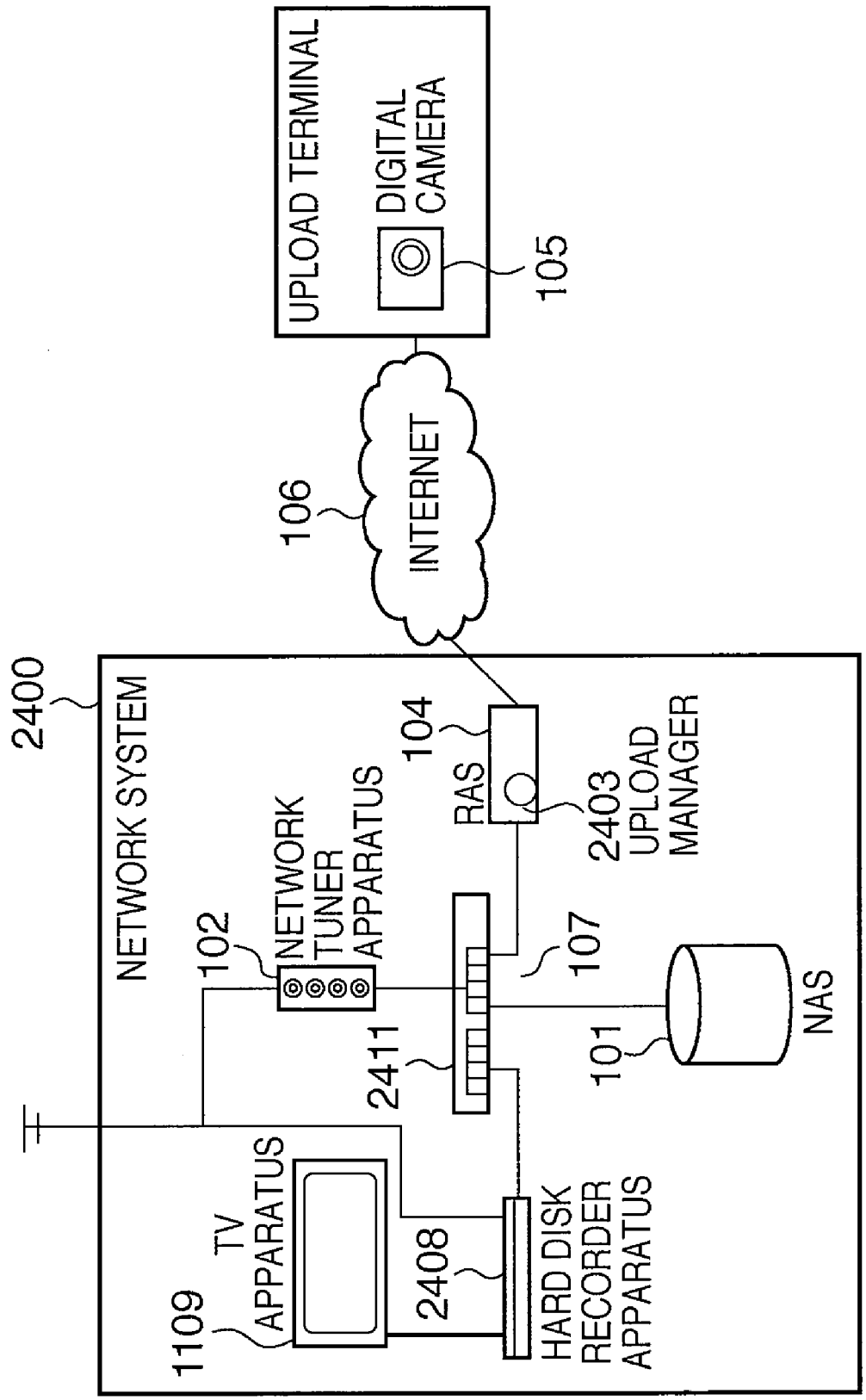
FIG. 20 is a view showing the arrangement of a network system 2400 to which a remote access server having a control program (upload manager) for implementing a control method according to the fifth embodiment of the present invention is connected.
Figure 21:
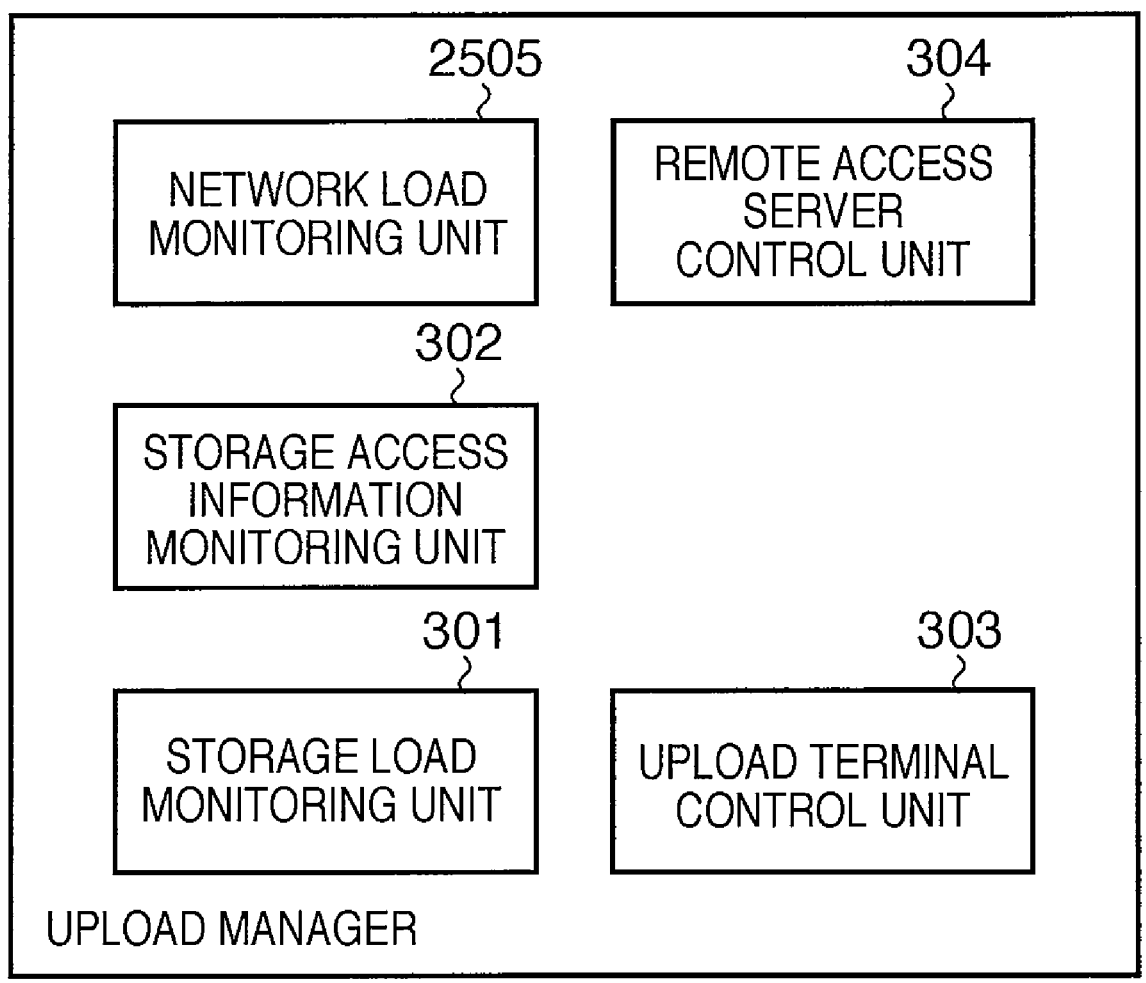
FIG. 21 is a block diagram showing the functional arrangement of an upload manager 2403.

FIG. 16 is a sequence chart showing the sequence of the communication process of the devices included in the network system 1700 upon receiving an upload process request from the digital camera 105. FIGS. 20 and 21 are flowcharts illustrating the detailed sequence of the process of the upload manager 1703.

The process sequence when the digital camera 105 sends an upload process request to the network system 1700 will be described with reference to FIGS. 19 to 21.

In this embodiment, assume that the PC 1710 and the hard disk recorder apparatus 1708 are already writing data in the storage device 101 when the upload process request is received.

To remote-access the network system 1700 from the digital camera 105, the user performs the following operation.

First, before carrying the digital camera 105 outside the network system 1700, the user acquires a remote access key, remote access information, and upload information from the remote access server 104 and stores them in the digital camera 105. If an adapter has a network access function, the pieces of information may be stored in the adapter.

Assume that the PC 1710 transmits a data transfer request message 1901 (FIG. 16) to the storage device 101 before the user operates the digital camera 105 to execute its remote upload function on the road. The data transfer request message 1901 (FIG. 16) is transmitted when, for example, the user wants to save, in the storage device 101, video data that has already been transcoded by the PC 1710.

Upon receiving the data transfer request message 1901 (FIG. 16), a network control unit 203 of the storage device 101 activates an access information monitoring unit 202 and an internal load monitoring unit 201, as in the first embodiment.

Then, an event notification (data transfer) message 1903 (FIG. 16) containing access information and process load information as parameters is transmitted to the upload manager 1703 that is a preset SNMP transmission destination.

The network control unit 203 of the storage device 101 also transmits a data transfer confirmation message 1902 (FIG. 16) to the PC 1710.

Upon receiving the data transfer confirmation message 1902 from the storage device 101, the PC 1710 starts transferring data 1904.

Upon receiving the data 1904 transferred from the PC 1710, the network control unit 203 of the storage device 101 activates a file control unit 204 to store the data 1904.

On the other hand, in step S2001, the upload manager 1703 monitors the presence/absence of reception of various kinds of event notifications. Hence, upon receiving the event notification (data transfer) message 1903 from the storage device 101, the upload manager 1703 advances the process to step S2002.

In step S2002, details of the event notification (data transfer) message 1903 are analyzed. Then, a storage load monitoring unit 301 is activated to calculate the state of process load of the storage device 101.

In step S2003, the storage load monitoring unit 301 determines whether the process load state of the storage device 101 is larger than a predetermined threshold value.

If it is determined in step S2003 that the process load state of the storage device 101 is smaller than the predetermined threshold value, the process advances to step S2005 to turn off a process load threshold value Over flag.

The process advances to step S2006 to activate the storage access device control unit 1806. The storage access device control unit 1806 determines whether the function of the device (the PC 1710 in this case) which accesses the storage device 101 is a priority function. If it is determined in step S2006 that the function of the device which accesses the storage device 101 has priority over the upload function, the process returns to step S2001. An example of the priority function of a device which access the storage device 101 is a function of recording video and sound data such as a TV image, IP-TV image, and satellite broadcast image which are broadcast at designated times. A case in which the function of the device is determined to have priority over the upload function will be described later as the fifth embodiment.

If it is determined in step S2006 that the function of the device which accesses the storage device 101 is not a priority function (e.g., recording function), the process advances to step S2007. In step S2007, the function limitation flag of the process executed in the transmission source (storage device 101) of the event notification (data transfer) message 1903 is turned on.

Assume that during transfer of the data 1904 from the PC 1710 to the storage device 101, the hard disk recorder apparatus 1708 transmits a data transfer request message 1905 (FIG. 16) to the storage device 101.

Upon receiving the data transfer request message 1905 (FIG. 16) from the hard disk recorder apparatus 1708, the network control unit 203 of the storage device 101 activates the access information monitoring unit 202 and the internal load monitoring unit 201.

Then, an event notification (data transfer) 1907 containing access information and process load information as parameters is transmitted to the upload manager 1703 that is a preset SNMP transmission destination.

The network control unit 203 of the storage device 101 also transmits a data transfer confirmation message 1906 to the hard disk recorder apparatus 1708.

Upon receiving the data transfer confirmation message 1906 from the storage device 101, the hard disk recorder apparatus 1708 starts transferring data 1908.

Upon receiving the data 1908 transferred from the hard disk recorder apparatus 1708, the network control unit 203 of the storage device 101 activates the file control unit 204 to store the data 1908.

On the other hand, in step S2001, the upload manager 1703 waits for the next event notification. When the storage access information monitoring unit 302 serving as an SNMP server receives the event notification (data transfer) 1907 from the storage device 101, the upload manager 1703 advances the process to step S2002.

In step S2002, details of the event notification (data transfer) 1907 are analyzed. Then, the storage load monitoring unit 301 is activated to calculate the state of process load of the storage device 101.

In step S2003, the storage load monitoring unit 301 determines whether the process load state of the storage device 101 is larger than a predetermined threshold value. If it is determined in step S2003 that the process load state of the storage device 101 is larger than the predetermined threshold value, the process advances to step S2004 to turn on the process load threshold value Over flag.

The process advances to step S2006 to activate the storage access device control unit 1806. The storage access device control unit 1806 determines whether the function of the device which accesses the storage device 101 is a priority function.

If it is determined in step S2006 that the function is not a priority function, the process advances to step S2007. The function limitation flag of the process (data transfer process) executed in the storage device 101 which is the transmission source of the event notification (data transfer) 1907 is turned on.

The upload manager 1703 repeats the process in steps S2001 to S2007 until it receives an upload request message.

Assume that the user then operates the digital camera 105 to execute its remote upload function on the road. The processes of the digital camera 105 and the remote access server 104 when the digital camera 105 executes the remote upload function are the same as in the first embodiment, and a description thereof will not be repeated.

Figure 17:
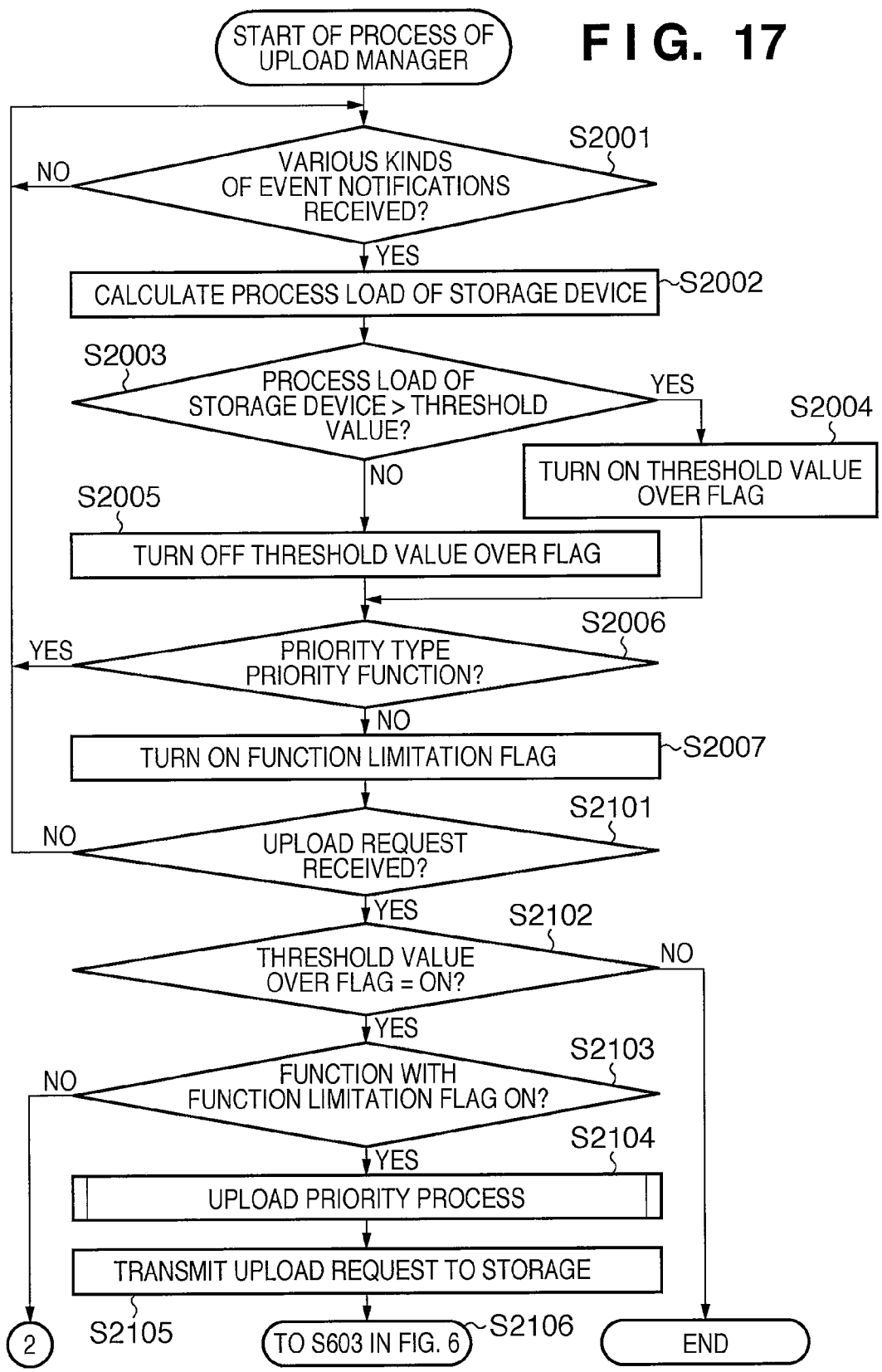
FIG. 17 is a flowchart illustrating the detailed sequence of the process of the upload manager 1703.

Upon receiving an upload request message 1911 (FIG. 16) from the remote access server 104, the upload manager 1703 determines in step S2101 (FIG. 17) that the upload request message 1911 is received. The process advances to step S2102.

In step S2102, the upload terminal control unit 303 of the upload manager 1703 which has received the upload request message 1911 determines whether the process load threshold value Over flag in the storage access information monitoring unit 302 is ON.

If it is determined in step S2102 that the threshold value Over flag is ON, the process advances to step S2103 to determine whether there is a storage access device whose function limitation flag is ON in the storage access device control unit 1806.

If it is determined in step S2103 that there is no device which is accessing the storage device 101 and has a function limitation flag in the ON state, the same process as that from step S1501 in FIG. 12 is executed. A description of the process will not be repeated.

If it is determined in step S2103 that there is a device which is accessing the storage device 101 and has a function limitation flag in the ON state, the process advances to step S2104. In step S2104, the upload terminal control unit 303 executes the following upload priority process.

Based on the information in the storage load monitoring unit 301, the upload terminal control unit 303 calculates a band limit value that is a target value in reducing the band from each device so that the process load of the storage device 101 decreases while giving priority to the upload process.

Next, the upload terminal control unit 303 transmits, as the band limitation instruction, TCP data amount limitation instruction messages 1912 and 1913 (FIG. 16) to the devices (PC 1710 and hard disk recorder apparatus 1708) which are accessing the storage device 101.

Upon receiving the TCP data amount limitation instruction messages 1912 and 1913 from the upload manager 1703, the PC 1710 and the hard disk recorder apparatus 1708 limit the TCP transmission amounts. The PC 1710 and the hard disk recorder apparatus 1708 also transmit TCP data amount limitation response messages 1914 and 1915 to the upload manager 1703, respectively.

Upon receiving the TCP data amount limitation response messages 1914 and 1915 from the PC 1710 and the hard disk recorder apparatus 1708, the storage access device control unit 1806 of the upload manager 1703 advances to step S2105. In step S2105, the upload terminal control unit 303 is activated to transmit an upload request message 1916 (FIG. 16) to the storage device 101.

The subsequent upload process is the same as that from step S603 in FIG. 6 of the first embodiment, and a description thereof will not be repeated.

As is apparent from the above description, execution of the upload manager according to this embodiment allows to achieve the object of the present invention and obtain the following unique effects.

It is possible to implement the function of giving priority to the upload process without increasing the process load, as compared to an arrangement which imparts the access limit function to the storage device 101 itself.

Fourth Embodiment

The present invention is not limited to the above-described embodiments. Modifications to be described below are also possible.

In the first and second embodiments, the storage access information monitoring unit 302 of the upload manager 103 receives an event notification (write) from the storage device 101. At this time, the operation function of the device accessing the storage device 101 which is the event notification transmission source is specified by determining whether the device itself has a recording function.

However, the present invention is not limited to this. The operation function of the access device may be specified by inquiring of the device that is accessing the storage device 101 (using SNMP or UPnP). That is, the operation function may be specified by acquiring information representing the operation function used to access the storage device 101.

In the third embodiment, the upload manager 1703 includes the storage access device control unit 1806. However, the present invention is not limited to this.

For example, a network band managing unit 2207 which manages the bands of ports (e.g., a port base QoS and an 802.1p tag base) of a switching hub device 1711 may be used in place of the storage access device control unit 1806.

Figure 18:
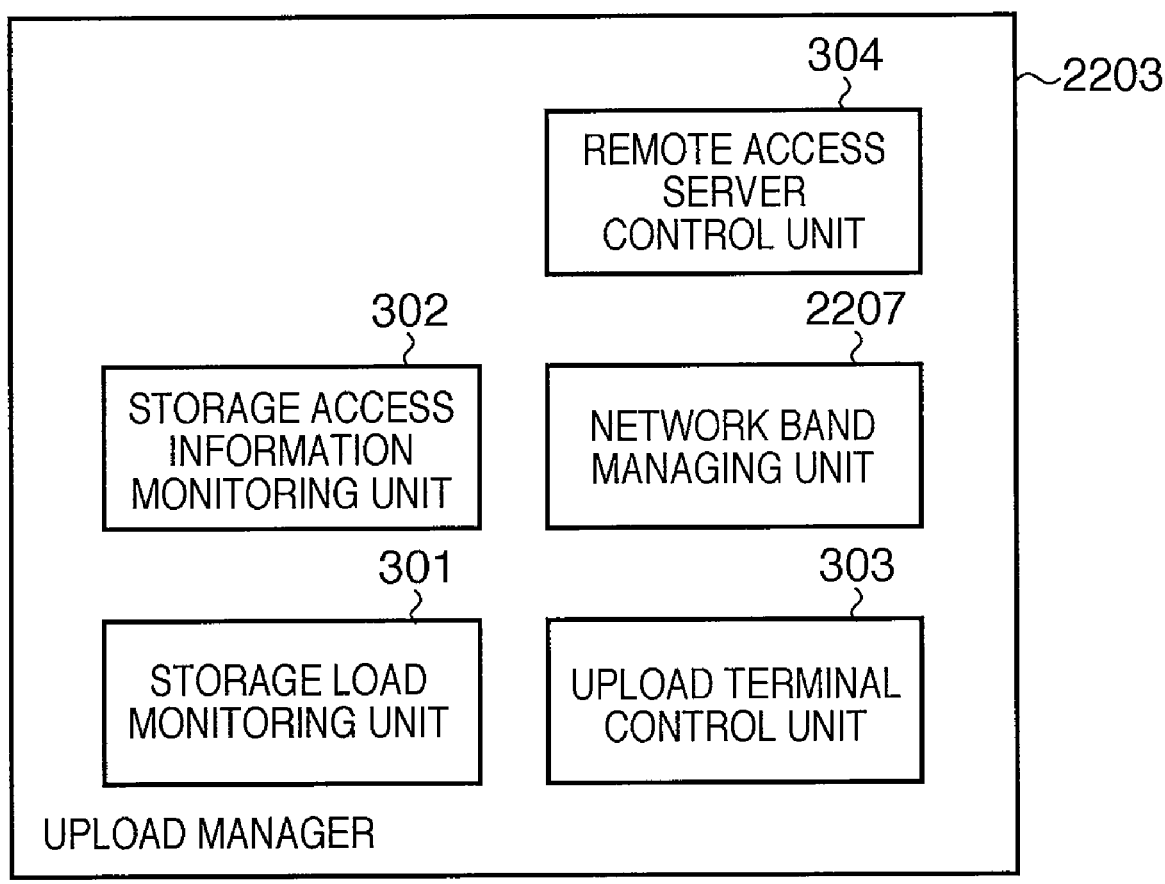
FIG. 18 is a block diagram showing the functional arrangement of a control program (upload manager) 2203 for implementing a control method according to the fourth embodiment of the present invention.

FIG. 18 is a block diagram showing the functional arrangement of an upload manager 2203 which uses the network band managing unit 2207 in place of the storage access device control unit 1806.

Figure 19:
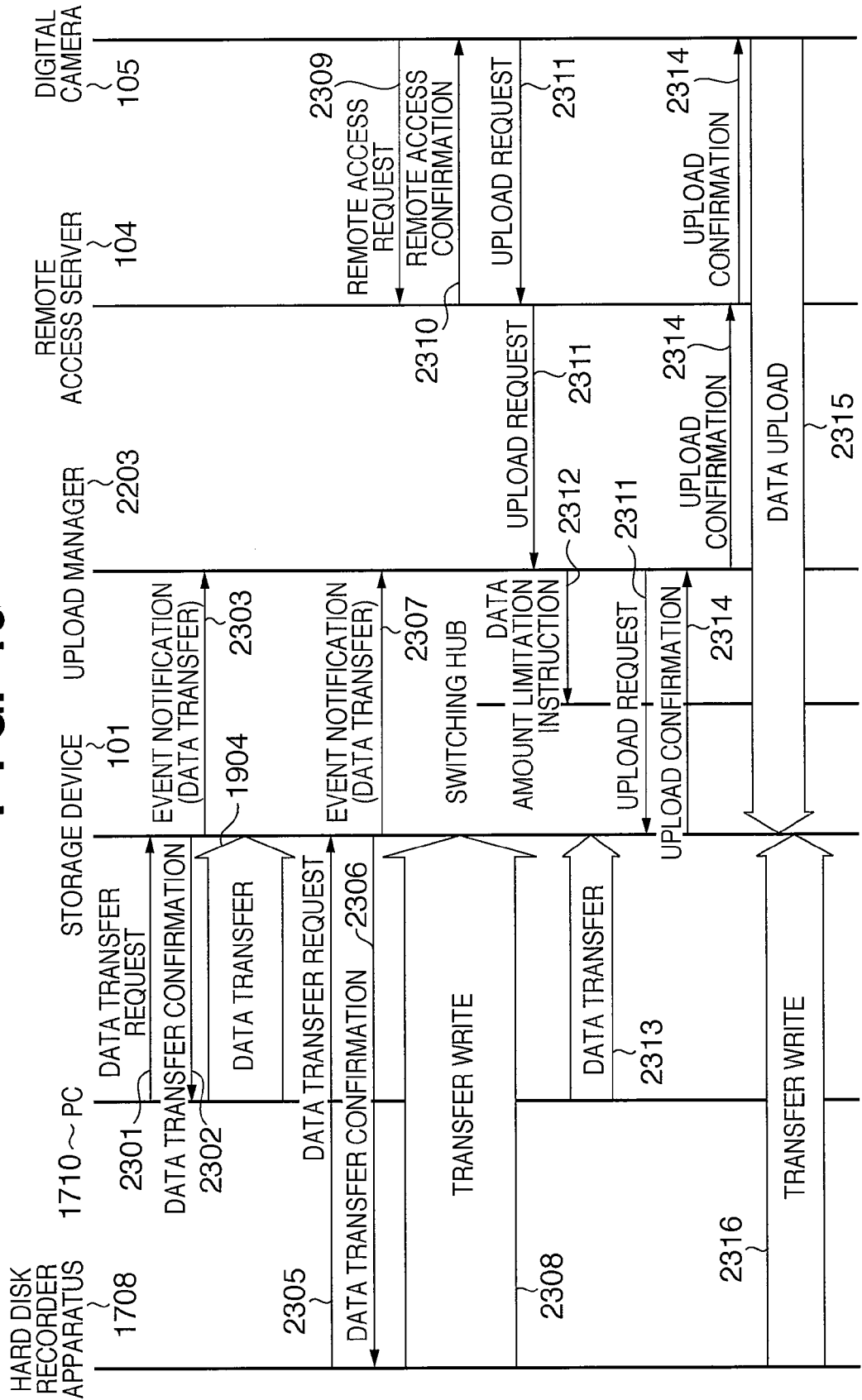
FIG. 19 is a sequence chart showing the sequence of the communication process of the devices included in a network system 1700 upon receiving an upload process request from a digital camera 105.

FIG. 19 is a sequence chart showing the overall sequence of the communication process of the devices included in a network system 1700 which uses the upload manager 2203 having the network band managing unit 2207.

As is apparent from FIG. 19, instead of limiting function limitation flag ON/OFF as in step S2104 of the third embodiment, the band of the network port of the switching hub device 1711 to which the device that is executing the function limitation flag ON is connected is narrowed down.

To implement this, a data amount limitation instruction message 2312 is transmitted to the switching hub device 1711 to control the packet flow rate to a storage device 101. In this case, the upload manager 2203 must always know information representing the device connected to the network port of the switching hub device 1711 and its time of use. For this purpose, the network band managing unit 2207 also serves as an SNMP server to receive various kinds of SNMP events from the switching hub device 1711.

In the first to third embodiments and in the fourth embodiment, SNMP is used as a means for acquiring information representing the device which is accessing the storage device 101 or the switching hub device 1711, and the function of the device.

However, the present invention is not limited to this. These pieces of information may be acquired by a periodically polling process from the upload manager 2203. Alternatively, the storage device 101 or the switching hub device 1711 may be caused to execute various kinds of processes after receiving an upload request message from an upload terminal (digital camera 105).

In the first to third embodiments and in the fourth embodiment, an upload manager 103 runs on the router where a remote access server 104 is operating. However, the present invention is not limited to this.

For example, the upload manager can run on any device such as a hard disk recorder apparatus 1708, personal computer (PC) 1710, TV apparatus 1109, network tuner apparatus 102, or switching hub device 1711, if it can always be activated. If the performance of the storage device 101 is sufficiently high for the operation of the upload manager, it may run on the storage device.

Fifth Embodiment

The fifth embodiment of the present invention will be described next with reference to the accompanying drawings. In this embodiment, a case will be described in which data is uploaded while a plurality of devices in a network are accessing a storage device. In this embodiment, the functions of devices which are accessing the storage device have priority over the upload process from a digital camera.

1. Arrangement of Network System

FIG. 20 is a view showing the arrangement of a network system 2400 to which a remote access server having a control program (upload manager) for implementing a control method according to this embodiment is connected. As in FIGS. 1, 11, and 17, the network system 2400 is designed to make a digital camera 105 carried outside the network connectable to a remote access server 104 via Internet 106.

A storage device 101 is connectable to a network 107 alone. An upload manager 2403 monitors the process load of the storage device 101 and, when the digital camera 105 uploads data via the remote access server 104, controls the process for the storage device 101.

A network tuner apparatus 102 has a function of transferring a TV radio image to the storage device 101 via the network 107 as record data.

The remote access server 104 manages remote access from the digital camera 105 or the like. The remote access management function is implemented on a router which has a firewall function of separately managing the Internet 106 (external network) and the network 107 (internal network).

The digital camera 105 (including a normal digital camera having a network connection adapter) can remote-access the network system 2400.

A TV apparatus 1109 plays back a video image and sound. A hard disk recorder apparatus 2408 receives and records TV broadcasting from the TV apparatus 1109. Note that the hard disk recorder apparatus of the fifth embodiment has a function of remote-recording data in an external network attached storage device (NAS).

Reference numeral 2411 denotes a switching hub device which executes network connection.

2. Functional Arrangements of Devices

Of the devices included in the network system 2400, the storage device 101 and the remote access server 104 have the same functional arrangements as in the first embodiment, and a description thereof will not be repeated.

FIG. 21 is a block diagram showing the functional arrangement of the upload manager 2403. The upload manager 2403 has a function 2505 in addition to functions 301 to 304.

The network load monitoring unit 2505 acquires and monitors the process load in the switching hub device 2411.

3. Sequence of Communication Process in Network System 2400

FIGS. 26 and 27 are sequence charts showing the sequence of the communication process of the devices included in the network system 2400 upon receiving an upload process request from the digital camera 105. FIGS. 28 and 29 are flowcharts illustrating the detailed sequence of the process of the upload manager 2403.

The process sequence when the digital camera 105 sends an upload process request to the network system 2400 will be described with reference to FIGS. 26 to 32.

In this embodiment, assume that the network tuner apparatus 102 and the hard disk recorder apparatus 2408 are already writing data in the storage device 101 when the upload process request is received.

To remote-access the network system 2400 from the digital camera 105, the user performs the following operation.

First, before carrying the digital camera 105 outside the network system 2400, the user acquires a remote access key, remote access information, and upload information from the remote access server 104 and stores them in the digital camera 105. If an adapter has a network access function, the pieces of information may be stored in the adapter.

Figure 22:
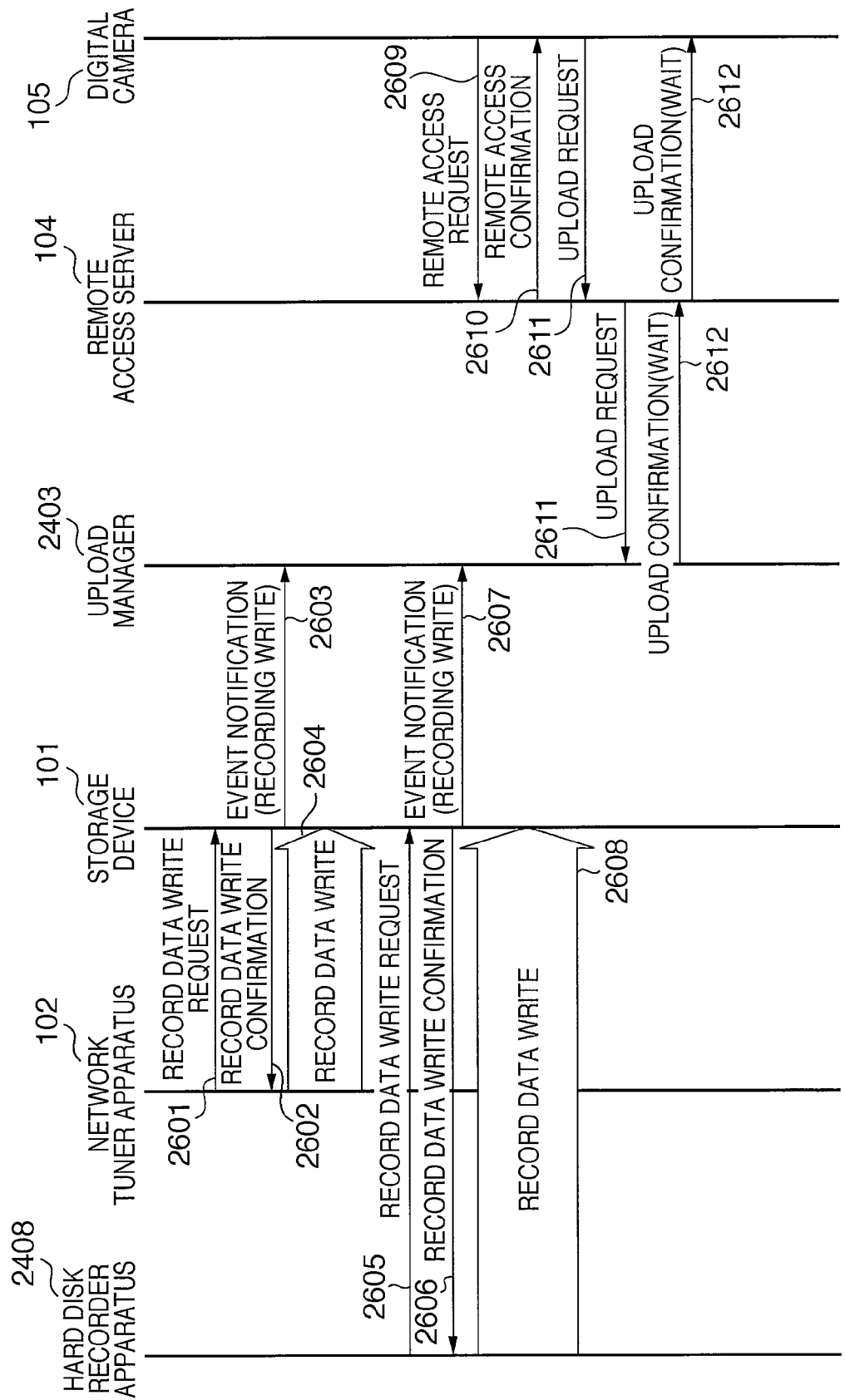
FIG. 22 is a sequence chart showing the sequence of the communication process of the devices included in the network system 2400 upon receiving an upload process request from a digital camera 105.

Assume that the network tuner apparatus 102 starts reserved recording and transmits a record data write request message 2601 (FIG. 22) to the storage device 101 before the user operates the digital camera 105 to execute its remote upload function.

Upon receiving the record data write request message 2601 (FIG. 22), a network control unit 203 of the storage device 101 transmits a record data write confirmation message 2602 (FIG. 22) to the network tuner apparatus 102.

Upon receiving the record data write confirmation message 2602 (FIG. 22), the network tuner apparatus 102 starts record data write 2604 in the storage device 101.

After that, in the storage device 101, an access information monitoring unit 202 and an internal load monitoring unit 201 are activated. Then, an event notification (recording write) message 2603 (FIG. 22) containing access information and process load information as parameters is transmitted to the upload manager 2403.

The event notification (recording write) message 2603 can be transmitted using, for example, SNMP (Simple Network Management Protocol) agent notification. The SNMP agent notification is set in the storage device 101 in advance to execute the transmission using the SNMP agent notification.

In step S2801, the upload manager 2403 is monitoring the presence/absence of reception of an event notification (recording write) message. Hence, upon receiving the event notification (recording write) message 2603 (FIG. 22), the upload manager 2403 activates the storage access information monitoring unit 302 in step S2801 to execute the following process.

In step S2802, the storage access information monitoring unit 302 analyzes details of the event notification (recording write) message 2603 and determines whether the function of the device which has transmitted the event notification (recording write) message 2603 has priority over the upload process. If it is determined that the function of the device is a priority function, the process advances to step S2803 (FIG. 24) to turn on the priority function flag of the process (recording write) executed in the storage device 101 that is the transmission source of the event notification (recording write) message 2603.

Then, the storage load monitoring unit 301 is activated to execute the following process.

In step S2804, the storage load monitoring unit 301 analyzes details of the event notification (recording write) message 2603 and calculates the process load of the storage device 101.

Assume that the hard disk recorder apparatus 2408 starts reserved recording and transmits a record data write request message 2605 (FIG. 22) to the storage device 101 before the user operates the digital camera 105 to execute its remote upload function.

Upon receiving the record data write request message 2605 (FIG. 22), the network control unit 203 of the storage device 101 transmits a record data write confirmation message 2606 (FIG. 22) to the hard disk recorder apparatus 2408.

Upon receiving the record data write confirmation message 2606 (FIG. 22), the hard disk recorder apparatus 2408 starts record data write 2608 in the storage device 101.

After that, the storage device 101 executes the following process using the already activated access information monitoring unit 202 and internal load monitoring unit 201. More specifically, an event notification (recording write) message 2607 (FIG. 22) containing access information and process load information as parameters is transmitted to the upload manager 2403.

The event notification (recording write) message 2607 is transmitted using, for example, the mechanism of SNMP.

In step S2801, the upload manager 2403 is monitoring the presence/absence of reception of an event notification (recording write) message, as described above. Hence, upon receiving the event notification (recording write) message 2607 (FIG. 22), the upload manager 2403 executes the following process using the already activated storage access information monitoring unit 302 in step S2801.

In step S2802, the storage access information monitoring unit 302 analyzes details of the event notification (recording write) message 2607 and determines whether the function of the device which has transmitted the event notification (recording write) message 2607 has priority over the upload process. If it is determined that the function of the device is a priority function, the process advances to step S2803 (FIG. 24) to turn on the priority function flag of the process (recording write) executed in the storage device 101 that is the transmission source of the event notification (recording write) message 2607.

Then, the storage load monitoring unit 301 is activated to execute the following process. In step S2804, the storage load monitoring unit 301 analyzes details of the event notification (recording write) message 2607 and calculates the process load of the storage device 101.

Assume that after the process in step S2804, the user operates the digital camera 105 to execute its remote upload function on the road.

The process until the digital camera 105 executes the remote upload function and transmits an upload request message 2611 to the upload manager 2403 is the same as in the first embodiment, and a description thereof will not be repeated.

In step S2805 (FIG. 24), the upload terminal control unit 303 of the upload manager 2403 receives the upload request message 2611.

In step S2806 (FIG. 24), it is determined whether the remaining load capacity of the storage device 101 is equal to or larger than the minimum allowable load for upload.

If it is determined in step S2806 that the remaining load capacity of the storage device 101 is equal to or larger than the minimum allowable load for upload, the process advances to step S2807 and then to step S3201 in FIG. 26.

The process executed upon determining that the remaining load capacity of the storage device 101 is equal to or larger than the minimum allowable load for upload will be described in detail later in the sixth embodiment.

Figure 24:
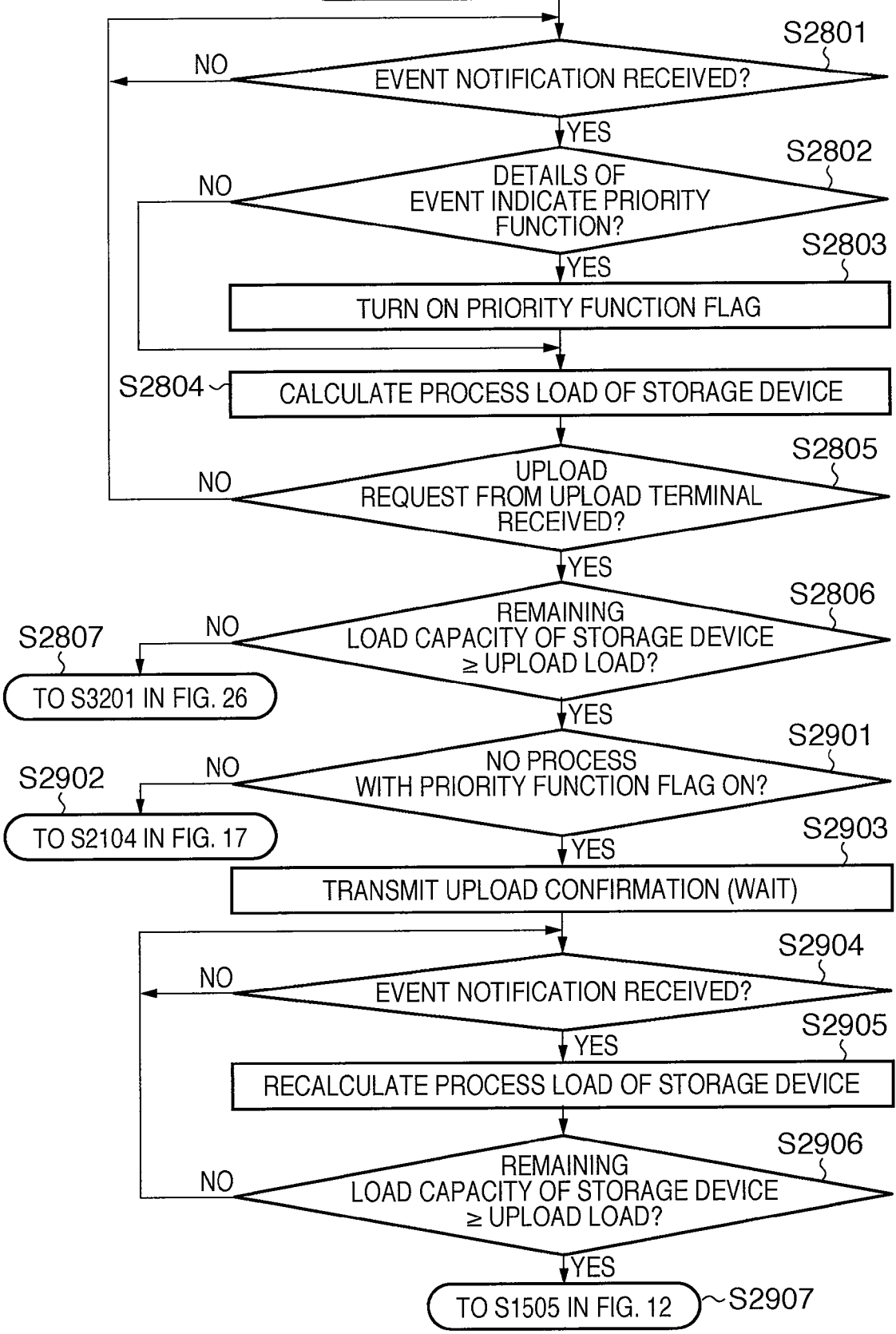
FIG. 24 is a flowchart illustrating the detailed sequence of the process of the upload manager 2403.

If it is determined in step S2806 that the remaining load capacity of the storage device 101 is smaller than the minimum allowable load for upload, the process advances to step S2901 (FIG. 24).

In step S2901 (FIG. 24), it is determined, by referring to the priority function flag representing whether the function of the device accessing the storage device 101 is a priority function, whether there is a process whose priority function flag is OFF.

If it is determined in step S2901 that there is a process whose priority function flag representing whether the function of the device accessing the storage device 101 is a priority function is OFF, the following process is executed. Since upload can be done by stopping the process whose priority function flag is OFF, the process advances to step S2902 and then to step S2104 in FIG. 17.

If it is determined in step S2901 that there is no process whose priority function flag representing whether the function of the device accessing the storage device 101 is a priority function is OFF, that is, if the priority function flags of all processes are ON, the following process is executed. The process advances to step S2903 (FIG. 24).

In step S2903 (FIG. 24), the upload terminal control unit 303 of the upload manager 2403 transmits an upload confirmation (wait) message 2612 (FIG. 22) to the digital camera 105 via the remote access server 104. Note that the upload confirmation (wait) message 2612 (FIG. 22) notifies the digital camera that the upload manager rejects upload (stops data transmission) in effect.

Upon receiving the upload confirmation (wait) message 2612 (FIG. 22) via the Internet 106, the upload terminal (digital camera 105) shifts to a remote upload wait state.

Figure 23:
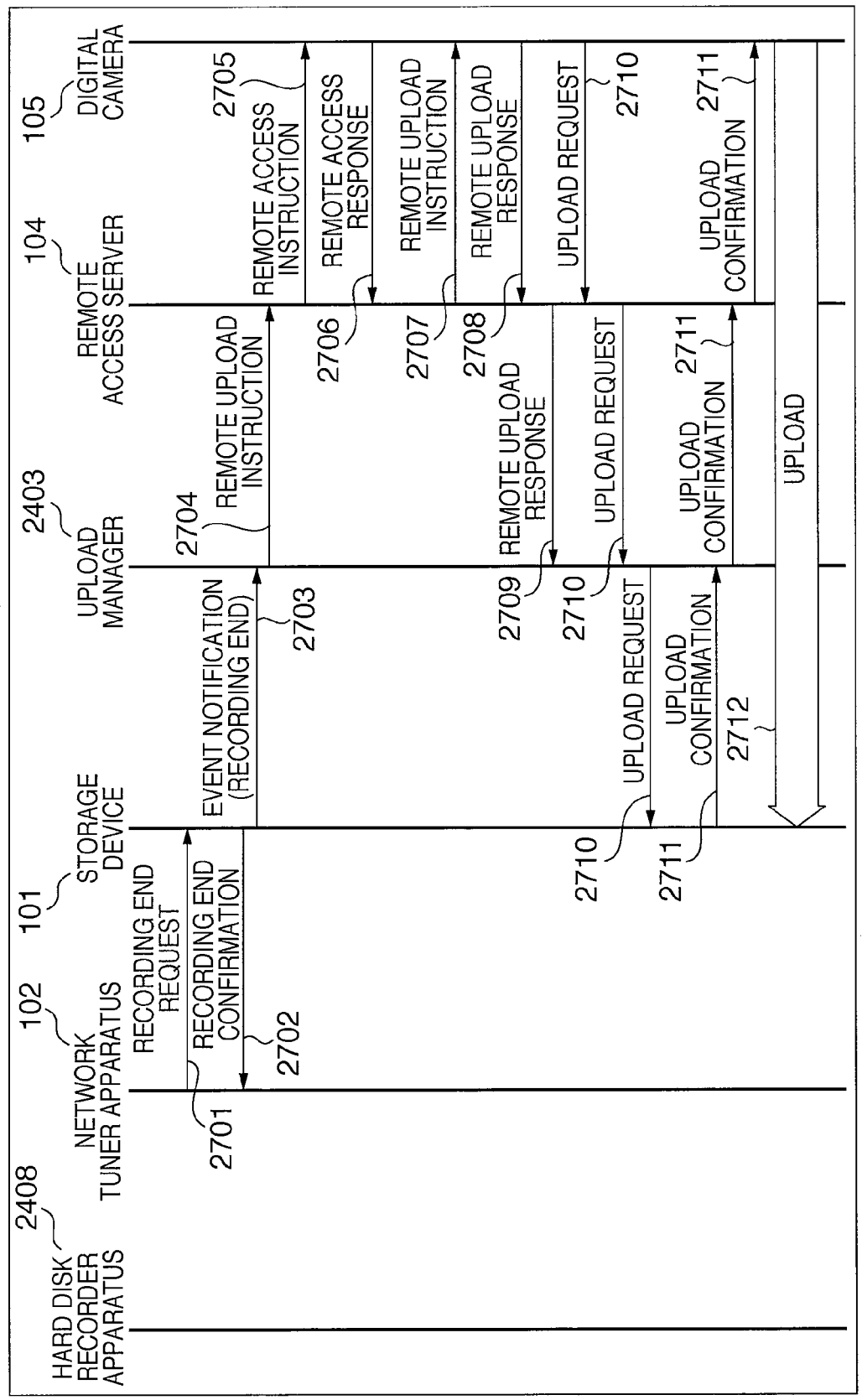
FIG. 23 is a sequence chart showing the sequence of the communication process of the devices included in the network system 2400 upon receiving an upload process request from the digital camera 105.

Assume that when the digital camera 105 is in the remote upload wait state, recording of the record data write 2604 (FIG. 22) in the network tuner apparatus 102 finishes, and a recording end request message 2701 (FIG. 23) is transmitted to the storage device 101.

Upon receiving the recording end request message 2701 (FIG. 23) from the network tuner apparatus 102, the network control unit 203 of the storage device 101 activates the access information monitoring unit 202 and the internal load monitoring unit 201. Then, an event notification (recording end) 2703 (FIG. 23) containing access information and process load information as parameters is transmitted to the upload manager 2403 that is a preset SNMP transmission destination.

The network control unit 203 of the storage device 101 also transmits a recording end confirmation message 2702 (FIG. 23) to the network tuner apparatus 102.

Upon receiving the recording end confirmation message 2702 (FIG. 23) from the storage device 101, the network tuner apparatus 102 finishes the process.

After transmitting the upload confirmation (wait) message 2612 (FIG. 22), the upload manager 2403 monitors the presence/absence of reception of the event notification (recording end) 2703 (FIG. 23) in step S2904.

If the upload manager 2403 determines that the storage access information monitoring unit 302 serving as an SNMP server has received the event notification (recording end) 2703 from the storage device 101, the process advances to step S2905.

In step S2905, details of the event notification (recording end) 2703 are analyzed. Then, the storage load monitoring unit 301 is activated to calculate the state of process load of the storage device 101. In step S2906, the storage load monitoring unit 301 determines whether the remaining load capacity of the storage device 101 is equal to or larger than the minimum allowable load for upload.

If it is determined in step S2906 that the remaining load capacity of the storage device 101 is equal to or larger than the minimum allowable load for upload, the process advances to step S2907 and then to step S1505 in FIG. 12.

The sequences 2704 to 2712 from step S2907 are the same as those from step S1505, and a description thereof will not be repeated.

If it is determined in step S2906 that the remaining load capacity of the storage device 101 is smaller than the minimum allowable load for upload, the process returns to step S2904 (FIG. 24).

As is apparent from the above description, execution of the upload manager according to this embodiment allows achieving the object of the present invention and obtaining the following unique effects.

It is possible to more flexibly implement the upload process function, as compared to an arrangement which imparts the access limit function to the storage device 101 itself or implements the upload limitation flag in the upload manager.

Sixth Embodiment

The sixth embodiment of the present invention will be described next with reference to the accompanying drawings. In this embodiment, a case will be described in which data is uploaded while a plurality of devices in a network are accessing a storage device. In this embodiment, the functions of devices which are accessing the storage device have priority over the upload process from a digital camera. Additionally, the process executed, in the fifth embodiment, upon determining in step S2804 that the remaining load capacity of the storage device 101 is equal to or larger than the minimum allowable load for upload will be described in detail.

1. Arrangement of Network System

The arrangement of a network system according to this embodiment is the same as in the fifth embodiment, and a description thereof will not be repeated.

2. Functional Arrangements of Devices

The functional arrangements of the devices of this embodiment are the same as in the fifth embodiment, and a description thereof will not be repeated.

3. Sequence of Communication Process in Network System 2400

FIG. 25 is a sequence chart showing the sequence of the communication process of the devices included in the network system 2400 upon receiving an upload process request from a digital camera 105. FIGS. 31 and 32 are flowcharts illustrating the detailed sequence of the process of an upload manager 2403.

The process sequence when the digital camera 105 sends an upload process request to the network system 2400 will be described with reference to FIGS. 30 to 32.

In this embodiment, assume that a network tuner apparatus 102 and a hard disk recorder apparatus 2408 are already writing data in a storage device 101 when the upload process request is received, as in the fifth embodiment.

To remote-access the network system 2400 from the digital camera 105, the user performs the following operation.

First, before carrying the digital camera 105 outside the network system 2400, the user acquires a remote access key, remote access information, and upload information from a remote access server 104 and stores them in the digital camera 105. If an adapter has a network access function, the pieces of information may be stored in the adapter.

Assume that the network tuner apparatus 102 starts reserved recording and transmits a record data write request message 3001 (FIG. 25) to the storage device 101 before the user operates the digital camera 105 to execute its remote upload function.

The process from the record data write request message 3001 (FIG. 25) to an upload request 3011 (FIG. 25) to the upload manager 2403 is the same as the process to be described below, and a description thereof will not be repeated. That is, the process is the same as the process from the record data write request message 2601 (FIG. 22) to the upload request message 2611 (FIG. 22) to the upload manager 2403 in the fifth embodiment. The process in steps S3101 to S3106 of the flowchart in FIG. 26 is the same as the process in steps S2801 to S2806 in FIG. 24 of the fifth embodiment, and a description thereof will not be repeated.

If it is determined in step S3106 that the remaining load capacity of the storage device 101 is smaller than the minimum allowable load for upload, the process advances to step S2901 (FIG. 24). The subsequent process is the same as that from step S2901 (FIG. 24) in the fifth embodiment, and a description thereof will not be repeated.

If it is determined in step S3106 that the remaining load capacity of the storage device 101 is equal to or larger than the minimum allowable load for upload, the process advances to step S3201 (FIG. 26).

In step S3201 (FIG. 26), a network load monitoring unit 2505 is activated to execute the following process. To know current traffic in a network 107, the network load monitoring unit 2505 transmits a data amount acquisition instruction 3012 (FIG. 25) to a switching hub device 2411. The process advances to step S3202 to monitor reception of a data amount acquisition response.

Upon receiving the data amount acquisition instruction 3012 (FIG. 25) from the upload manager 2403, the switching hub device 2411 executes the following process. The switching hub device 2411 transmits, to the upload manager 2403, a data amount acquisition response 3013 (FIG. 25) containing the current packet flow rate and the maximum allowable flow rate of the network 107 as parameters.

The network load monitoring unit 2505 of the upload manager 2403, which monitors reception of the data amount acquisition response 3013 (FIG. 25) from the switching hub device 2411 in step S3202, advances to step S3203 to execute the following process.

In step S3203, the network load monitoring unit 2505 analyzes details of the parameters of the data amount acquisition response 3013 (FIG. 25) from the switching hub device 2411 and calculates the remaining band in the network 107. The network load monitoring unit 2505 also determines whether the remaining band is equal to or larger than the minimum band used for upload.

If it is determined in step S3203 that the remaining band in the network 107 is equal to or larger than the minimum band used for upload, the process advances to step S3204 and then to step S602 in FIG. 6. In the subsequent sequence, an upload terminal control unit 303 of the upload manager 2403 transmits an upload request 3014 (FIG. 25) to the storage device 101. The process until the digital camera 105 transmits upload data 3016 (FIG. 25) to the storage device 101 is the same as the process to be described below. That is, the process is the same as the process of causing the upload terminal control unit 303 of the upload manager 103 to transmit the upload request message 503 (FIG. 5) and causing the digital camera 105 to upload the data 505 (FIG. 5) to the storage device 101 in the first embodiment, and a description thereof will not be repeated.

If it is determined in step S3203 that the remaining band in the network 107 is smaller than the minimum band used for upload, the process advances to step S3205 and then to step S2903 in FIG. 24.

As is apparent from the above description, execution of the upload manager according to this embodiment allows achieving the object of the present invention and obtaining the following unique effects.

It is possible to implement a more reliable upload process function independently of the network load by taking the load capacity of the network 107 into consideration.

Other Embodiments

The present invention is applicable to a system including a plurality of devices (e.g., host computer, interface device, reader, and printer) or an apparatus (e.g., copying machine or facsimile apparatus) including a single device.

The object of the present invention is achieved even by supplying a recording medium which records software program codes for implementing the functions of the above-described embodiments to the system or apparatus. In this case, the computer (or CPU or MPU) of the system or apparatus reads out and executes the program codes stored in the recording medium, thereby implementing the functions. Note that the recording medium which records the program codes constitutes the present invention.

Examples of the recording medium usable to supply the program codes are a Floppy® disk, hard disk, optical disk, magnetooptical disk, CD-ROM, CD-R, magnetic tape, non-volatile memory card, and ROM.

The functions of the above-described embodiments are implemented not only when the computer executes the readout program codes but also when, for example, the OS (Operating System) running on the computer partially or wholly executes actual processing based on the instructions of the program codes.

The functions of the above-described embodiments are also implemented when the program codes read out from the recording medium are written in the memory of a function expansion board inserted into the computer or a function expansion unit connected to the computer. That is, after the program codes are written in the memory, the CPU of the function expansion board or function expansion unit partially or wholly executes actual processing based on the instructions of the program codes, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-150777, filed on Jun. 6, 2007, which is hereby incorporated by reference herein in its entirety.

What is claimed is:

1. A control method of controlling a process load of a Network Attached Storage (NAS) device that is attached a first network, comprising the steps of:
   acquiring, in an upload manager that runs in a device different from the NAS device, at least one of a process load of the NAS device, which is data transmitted from a device connected to the first network written into the NAS device, or a process load of the NAS device, which is data read out from the NAS device by a device connected to the first network; and
   limiting, in the upload manager, flow rate between an upload device and a remote access server, wherein the upload device uploads data from a second network to the NAS device via the remote access server
   wherein upon receiving the instruction in the limitation instructing step, the remote access server temporarily stores the received data in a storage included in the remote access server, thereby limiting the flow rate.

2. The method according to claim 1, wherein the upload manager runs in remote access server.

3. The method according to claim 1, further comprising the step of, when the process load acquired in the acquiring step exceeds a predetermined threshold value, instructing the remote access server to limit the flow rate.

4. The method according to claim 3, wherein upon receiving the instruction in the limitation instructing step, the remote access server receives the data while performing flow control, thereby limiting the flow rate.

5. The method according to claim 3, wherein upon receiving the instruction in the limitation instructing step, the remote access server makes the upload device stop transmission of the data to the remote access server, thereby limiting the flow rate.

6. The method according to claim 5, further comprising the step of, when the process load of the NAS device is smaller than the predetermined threshold value, instructing the remote access server to start transmitting the data.

7. The method according to claim 3, further comprising the step of determining a type of a device which accesses the NAS device,
   wherein in the limitation instructing step, the instruction is sent to the remote access server when it is determined in the determining step that the device is a device of a predetermined type.

8. The method according to claim 3, further comprising the step of determining a priority function of a process of a device which accesses the NAS device,
   wherein in the limitation instructing step, the instruction is sent to the remote access server when it is determined in the determining step that the process from the device corresponds to a predetermined priority function.

9. The method according to claim 1, further comprising the step of determining a remaining band in the first network,
   wherein in the limiting step, an upload limitation instruction is sent to the remote access server when it is determined in the determining step that the remaining band in the first network is smaller than an upload band when data is uploaded from the upload device to the remote access server.

10. An upload manager device that controls a process load of a Network Attached Storage (NAS) device that is attached a first network, comprising:
   an acquisition unit that acquires at least one of a process load of the NAS device, which is data transmitted from a device connected to the first network written in the NAS device, or a process load of the NAS device, which is data read out from the NAS device by a device connected to the first network and
   a limiting unit that limits flow rate between an upload devise and a remote access server, wherein the upload devise uploads data from a second network to the NAS device via the remote access server,
   wherein the upload manager device is different from the NAS device and
   wherein upon receiving the instruction in the limitation instructing step, the remote access server temporarily stores the received data in a storage included in the remote access server, thereby limiting the flow rate.

11. The apparatus according to claim 10, wherein the upload manager device is included in the remote access server.

12. A non-transitory computer-readable storage medium which stores a program for causing a computer to execute a control method set forth in claim 1.

* * * * *